(12) United States Patent
Akabane et al.

(10) Patent No.: US 10,725,546 B2
(45) Date of Patent: Jul. 28, 2020

(54) TACTILE PRESENTATION DEVICE AND TOUCH PANEL

(71) Applicant: FUJITSU COMPONENT LIMITED, Tokyo (JP)

(72) Inventors: Ayumu Akabane, Tokyo (JP); Fumio Takei, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 15/888,185

(22) Filed: Feb. 5, 2018

(65) Prior Publication Data
US 2018/0239433 A1    Aug. 23, 2018

(30) Foreign Application Priority Data
Feb. 17, 2017    (JP) .................. 2017-027665

(51) Int. Cl.
| | | |
|---|---|---|
| G06F 3/01 | (2006.01) | |
| G06F 3/044 | (2006.01) | |
| G06F 3/041 | (2006.01) | |
| G06F 3/045 | (2006.01) | |
| G06F 3/043 | (2006.01) | |
| H02N 2/18 | (2006.01) | |

(52) U.S. Cl.
CPC .............. G06F 3/016 (2013.01); G06F 3/043 (2013.01); G06F 3/044 (2013.01); G06F 3/045 (2013.01); G06F 3/0414 (2013.01); G06F 3/0416 (2013.01); H02N 2/181 (2013.01)

(58) Field of Classification Search
CPC ...... G06F 3/016; G06F 3/0414; G06F 3/0416; G06F 3/043; G06F 3/044; G06F 3/045; G06F 3/017; G06F 3/0436; G06F 3/041; G06F 1/169; G06F 3/038; H02N 2/181
See application file for complete search history.

(56) References Cited

U.S. PATENT DOCUMENTS

| | | | |
|---|---|---|---|
| 9,400,571 B2 | 7/2016 | Kamata et al. | |
| 2003/0214486 A1* | 11/2003 | Roberts | G06F 3/0414 345/173 |
| 2007/0097073 A1* | 5/2007 | Takashima | G06F 3/038 345/156 |
| 2009/0273583 A1* | 11/2009 | Norhammar | G06F 3/0436 345/177 |
| 2011/0037706 A1* | 2/2011 | Pasquero | G06F 3/016 345/173 |
| 2011/0128250 A1* | 6/2011 | Murphy | G06F 3/016 345/174 |

(Continued)

FOREIGN PATENT DOCUMENTS

| | | |
|---|---|---|
| JP | H11-212725 | 8/1999 |
| JP | 2010-231609 | 10/2010 |
| WO | 2015/045059 | 4/2015 |

*Primary Examiner* — Richard J Hong
(74) *Attorney, Agent, or Firm* — IPUSA, PLLC

(57) ABSTRACT

A tactile presentation device includes a plate panel; a piezo-electric element attached to the panel; an actuator that drives the piezo-electric element to vibrate the piezo-electric element so that a tactile sensation is generated on the panel; a detection unit that detects an electrical signal generated at the piezo-electric element, touching of an object to the panel being detected based on the detected electrical signal.

9 Claims, 27 Drawing Sheets

(56) References Cited

U.S. PATENT DOCUMENTS

| | | | |
|---|---|---|---|
| 2011/0157049 A1* | 6/2011 | Lee | G06F 3/016 |
| | | | 345/173 |
| 2011/0199315 A1* | 8/2011 | Kent | G06F 3/0416 |
| | | | 345/173 |
| 2012/0105358 A1* | 5/2012 | Momeyer | G06F 3/0414 |
| | | | 345/174 |
| 2013/0127783 A1* | 5/2013 | Lee | G06F 3/043 |
| | | | 345/175 |
| 2013/0191791 A1* | 7/2013 | Rydenhag | G06F 3/017 |
| | | | 715/863 |
| 2013/0201134 A1* | 8/2013 | Schneider | G06F 3/041 |
| | | | 345/173 |
| 2013/0222126 A1* | 8/2013 | Aono | G06F 3/041 |
| | | | 340/407.2 |
| 2014/0176455 A1* | 6/2014 | Araki | G06F 3/016 |
| | | | 345/173 |
| 2015/0070597 A1* | 3/2015 | Hsieh | G06F 1/169 |
| | | | 349/12 |
| 2015/0253852 A1* | 9/2015 | Ota | G06F 3/016 |
| | | | 455/418 |
| 2016/0349922 A1* | 12/2016 | Choi | G06F 3/043 |
| 2016/0357279 A1* | 12/2016 | Choi | G06F 3/043 |
| 2018/0164937 A1* | 6/2018 | Lynn | G06F 3/0416 |
| 2020/0026357 A1* | 1/2020 | Kirsch | G06F 3/043 |

* cited by examiner

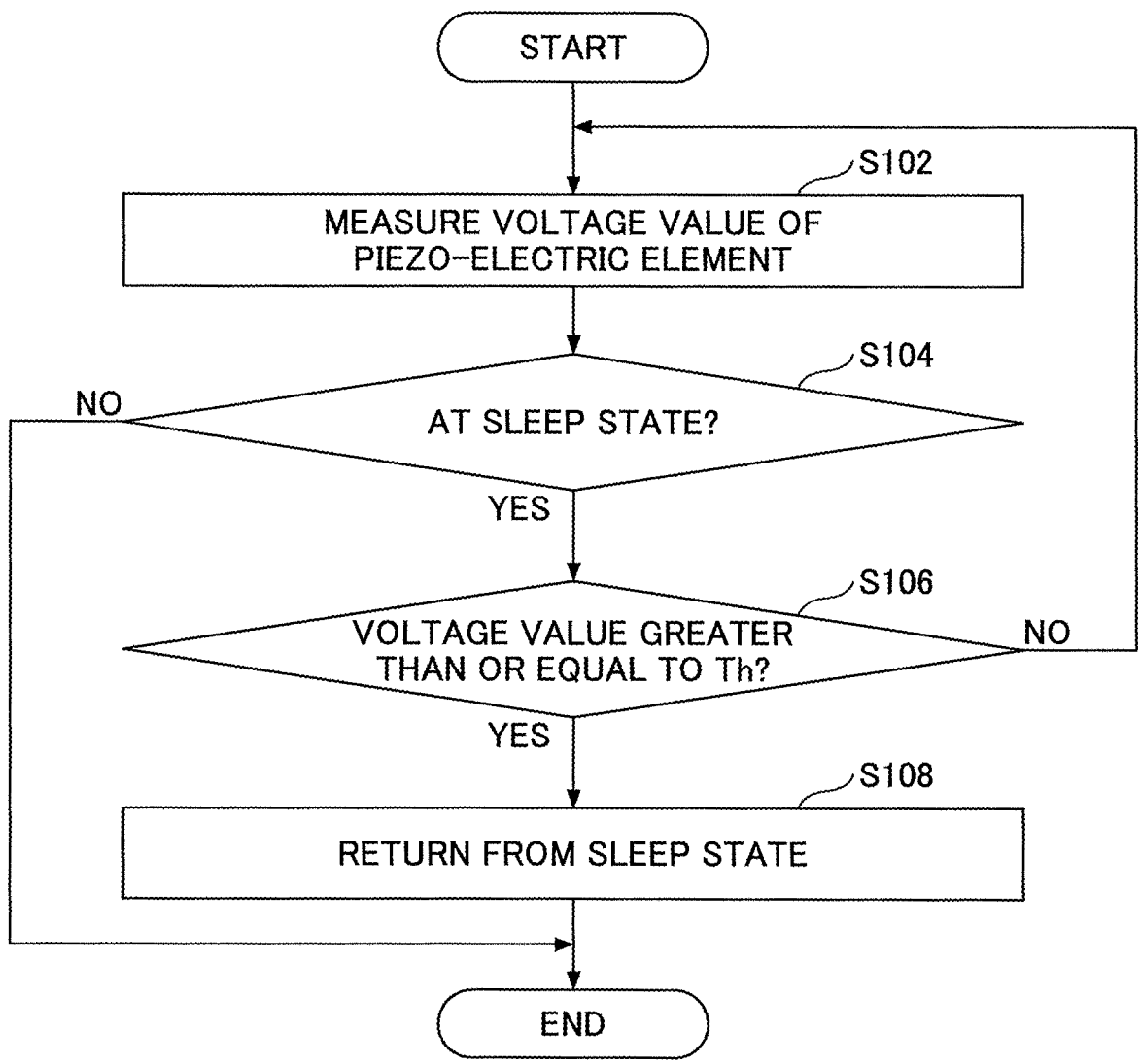

TIME

TIME

TIME

TIME

TACTILE PRESENTATION DEVICE AND TOUCH PANEL

CROSS-REFERENCE TO RELATED APPLICATION

The present application is based on and claims the benefit of priority of Japanese Priority Application No. 2017-27665 filed on Feb. 17, 2017, the entire contents of which are hereby incorporated by reference.

BACKGROUND OF THE INVENTION

1. Field of the Invention

The present invention relates to a tactile presentation device and a touch panel.

2. Description of the Related Art

Recently, a touch panel is used as a data input device to which data (information) is input by a finger or the like. A touch panel is used by being mounted on a display device such as a liquid crystal display, and when a finger touches (contacts) the touch panel, a touched position is detected, and data is input or an operation is performed in accordance with the touched position. Such a touch panel is used for, for example, an ATM machine, a game device, a portable communication device including a screen or the like.

There is a kind of a touch panel in which a tactile presentation device that presents a tactile sensation is provided.

Further, there is a kind of a touch panel that has a function to turn a display to a sleep state to reduce electricity consumption when the display is not used for long time, and return the display from the sleep state when a finger or the like touches the touch panel. However, in such a case, if the touch panel is also turned to a sleep state or the touch panel is switched off, as data is input by operating the touch panel, data cannot be input, and it is impossible to return the display from the sleep state even though the touch panel is touched.

Thus, a technique to easily return from the sleep state is required even when the touch panel is turned to the sleep state in addition to turning the display to the sleep state.

Further, in order to obtain a tactile sensation at the touch panel, the touch panel and a panel to present the tactile sensation are necessary. Thus, the device becomes thick and the cost for the device is also increased. Thus, a touch panel having a tactile presentation function in a small-size with a low cost is required.

PATENT DOCUMENTS

[Patent Document 1] Japanese Laid-open Patent Publication No. H11-212725
[Patent Document 2] Japanese Laid-open Patent Publication No. 2010-231609
[Patent Document 3] WO 2015/045059

SUMMARY OF THE INVENTION

According to an embodiment, there is provided a tactile presentation device including a plate panel; a piezo-electric element attached to the panel; an actuator that drives the piezo-electric element to vibrate the piezo-electric element so that a tactile sensation is generated on the panel; a detection unit that detects an electrical signal generated at the piezo-electric element, touching of an object to the panel being detected based on the detected electrical signal.

BRIEF DESCRIPTION OF THE DRAWINGS

Other objects, features and advantages of the present invention will become more apparent from the following detailed description when read in conjunction with the accompanying drawings.

FIG. 11 is a flowchart of a method of controlling the tactile presentation device of the first embodiment;

DETAILED DESCRIPTION OF THE PREFERRED EMBODIMENTS

Figure 1:
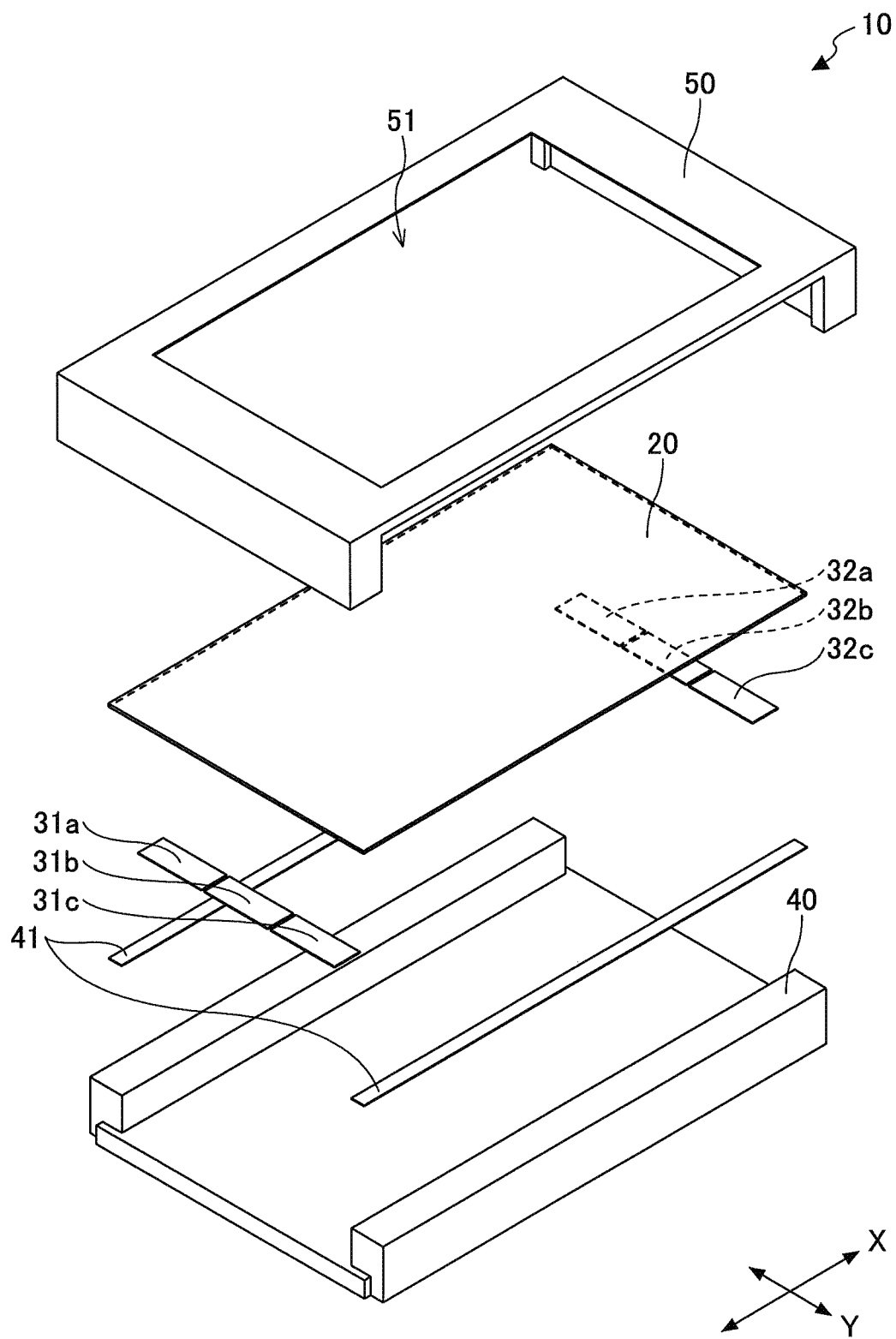
FIG. 1 is an exploded perspective view of a tactile presentation device of a first embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

First Embodiment (Tactile Presentation Apparatus)

Figure 2A:
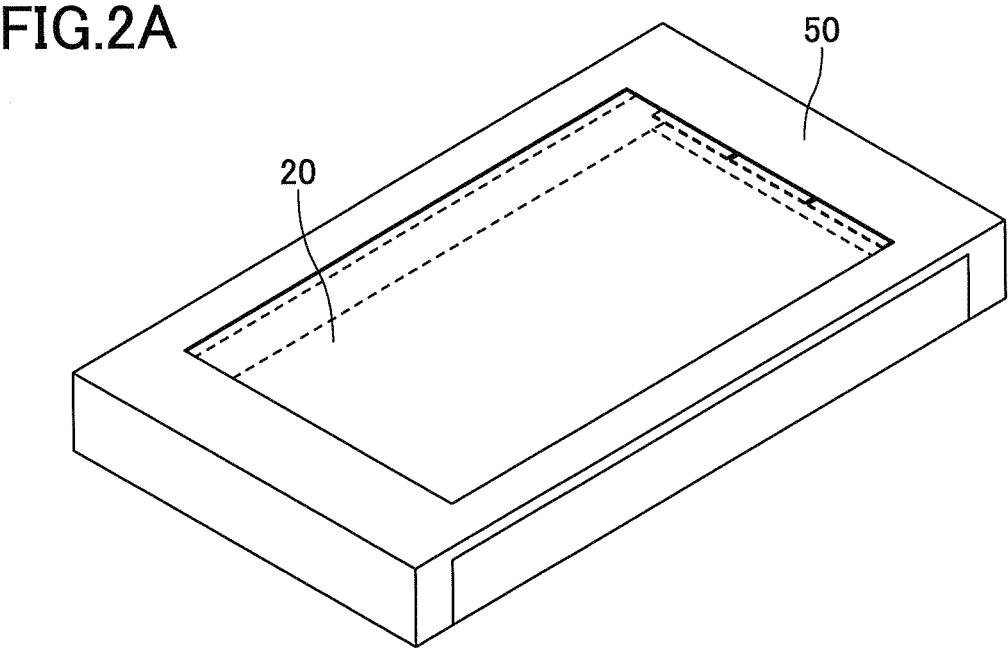
FIG. 2A to FIG. 2C are views for describing the tactile presentation device of the first embodiment.
Figure 2B:
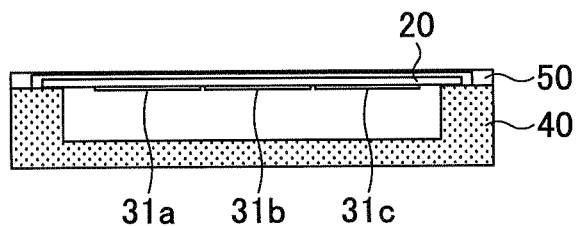
Figure 2C:
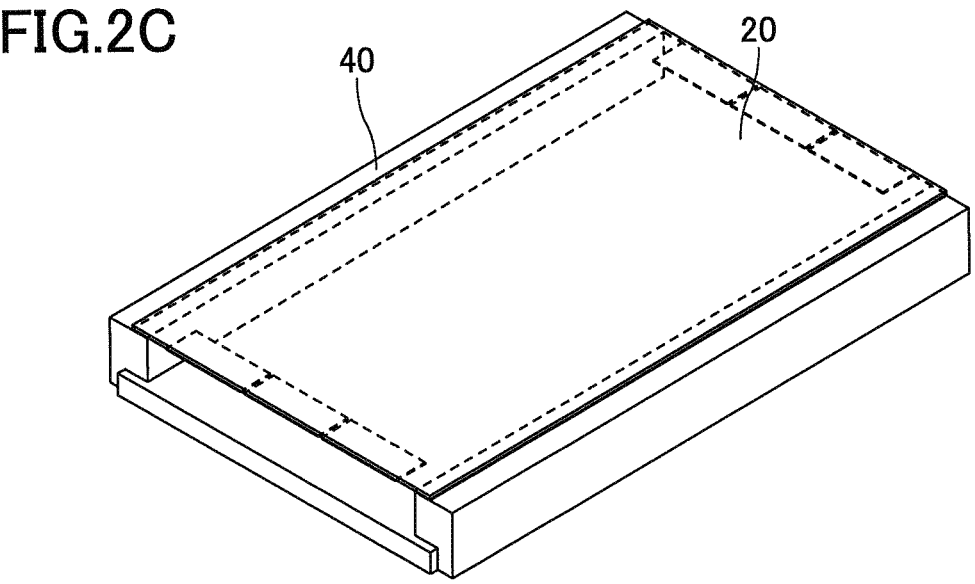

A tactile presentation device of a first embodiment is described with reference to FIG. 1 to FIG. 2C. FIG. 1 is an exploded perspective view of a tactile presentation device 10 of the embodiment. FIG. 2A is a perspective view of the tactile presentation device 10, FIG. 2B is a cross-sectional view of the tactile presentation device 10, and FIG. 2C is a perspective view of the tactile presentation device 10 where a cover 50 is removed.

The tactile presentation device 10 of the embodiment includes a rectangular panel 20, a plurality of piezo-electric elements 31a, 31b, 31c, 32a, 32b and 32c, a panel base 40 and the cover 50.

A front surface of the panel 20 is a surface on which a finger or the like touches. The piezo-electric elements 31a to 31c, and the piezo-electric elements 32a to 32c are adhered to a back surface of the panel 20 at both short sides, respectively. In this embodiment, each of the piezo-electric elements 31a to 31c and 32a to 32c is formed as a thin plate. Further, a hard adhesive agent may be used for adhering the piezo-electric elements 31a to 31c and 32a to 32c to the panel 20. Hereinafter, an object that touches the panel 20 including an object that is not actually a finger is referred to as a "finger".

The three piezo-electric elements 31a, 31b and 31c are adhered at one of the short sides of the panel 20 along the short side, and similarly, the three piezo-electric elements 32a, 32b and 32c are adhered at the other of the short sides of the panel 20 along the short side. The reason why a plurality of piezo-electric elements are aligned at each side will be described later.

The cover 50 is provided to protect edge surfaces of the panel 20, and an open portion 51 is provided at a center portion of the cover 50. The cover 50 is provided on the panel 20 from the front surface side of the panel 20. Hereinafter, a longitudinal direction of the panel 20 is referred to as an "X direction" and a shorter direction of the panel 20 is referred to as a "Y direction".

The panel 20 is formed by a plate glass or a resin material, and a material that can easily oscillate is preferable for the panel 20. In this embodiment, the panel 20 is formed by a chemically strengthened glass whose thickness is 0.3 mm to 0.7 mm.

The panel base 40 is a member to fix the panel 20, and two facing sides of the panel 20 are fixed to the panel base 40. It is preferable that the long sides of the panel 20 are fixed to the panel base 40. Specifically, the panel 20 is adhered to the panel base 40 at both long sides at the back surface via adhesive members 41, respectively. Although a linear double-sided tape is used as the adhesive member in the example of FIG. 1, the panel 20 may be fixed to the panel base 40 by other means.

Figure 3:
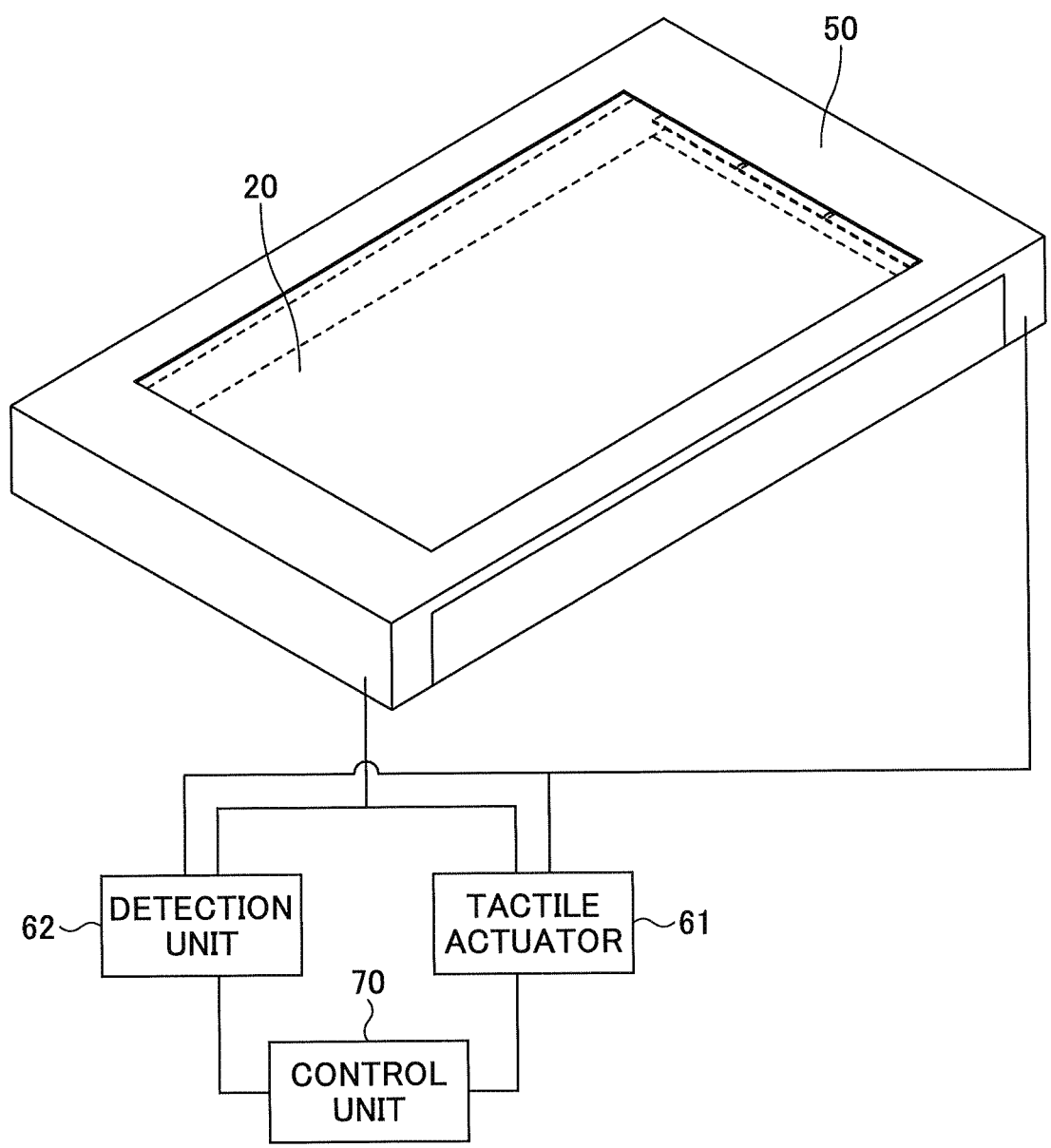
FIG. 3 is a view illustrating a structure of the tactile presentation device of the first embodiment.

As illustrated in FIG. 3, each of the piezo-electric elements 31a to 31c and 32a to 32c is connected to a tactile actuator 61 and a detection unit 62. The tactile actuator 61 and the detection unit 62 are connected to a control unit 70.

As will be described later, the tactile actuator 61 has a function to drive the piezo-electric elements 31a to 31c and 32a to 32c by applying voltage to each of the piezo-electric elements 31a to 31c and 32a to 32c for presenting a tactile sensation by using the piezo-electric elements 31a to 31c and 32a to 32c. The tactile actuator 61 may independently drive each of the piezo-electric elements 31a to 31c and 32a to 32c.

The detection unit 62 detects voltage output from each of the piezo-electric elements 31a to 31c and 32a to 32c. The detection unit 62 detects a touched position on the panel 20 by using the piezo-electric elements 31a to 31c and 32a to 32c. The detection unit 62 detects touching of an object to the panel 20 based on the voltage output from each of the piezo-electric elements 31a to 31c and 32a to 32c.

Furthermore, the control unit 70 includes a memory that stores a program to perform processes of a method of controlling the tactile presentation device 10, which will be described later, and the control unit 70 controls the components of the tactile presentation device 10 to perform the method of controlling. Thus, the detection unit 62 and the tactile actuator 61 are controlled by the control unit 70.

In this embodiment, the piezo-electric elements 31a to 31c and 32a to 32c are driven by providing supersonic high-frequency power from the tactile actuator 61 to each of the piezo-electric elements 31a to 31c and 32a to 32c, and the panel 20 is wave-vibrated to generate a high-pressure air film at the front surface of the panel 20. By forming such a high-pressure air film at the front surface of the panel 20, a friction sensitivity to a finger that touches the surface of the panel 20 is lowered, and a tactile sensation such as a smoothness can be given. By controlling the air film generated at the front surface of the panel 20, the given tactile sensation, specifically, a degree of lowering of the friction sensitivity can be changed.

When a finger touches the panel 20, the panel 20 is deformed. When this deformation is applied to each of the piezo-electric elements 31a to 31c and 32a to 32c, an electrical signal is generated from each of the piezo-electric elements 31a to 31c and 32a to 32c. By detecting such electrical signals generated from the piezo-electric elements 31a to 31c and 32a to 32c by the detection unit 62 and processing them by the control unit 70, a fact that the finger touches the panel 20, and a position on the panel 20 at which the finger touches can be detected. Here, it is preferable to provide a plurality of the piezo-electric elements at each side if a touched position is to be detected because the touched position is determined based on magnitudes of output voltages from the piezo-electric elements 31a to 31c and 32a to 32c, respectively.

As such, the piezo-electric elements 31a to 31c and 32a to 32c of the embodiment are used for both of a function of presenting a tactile sensation and a function of detecting a touched position on the panel 20.

Figure 4:
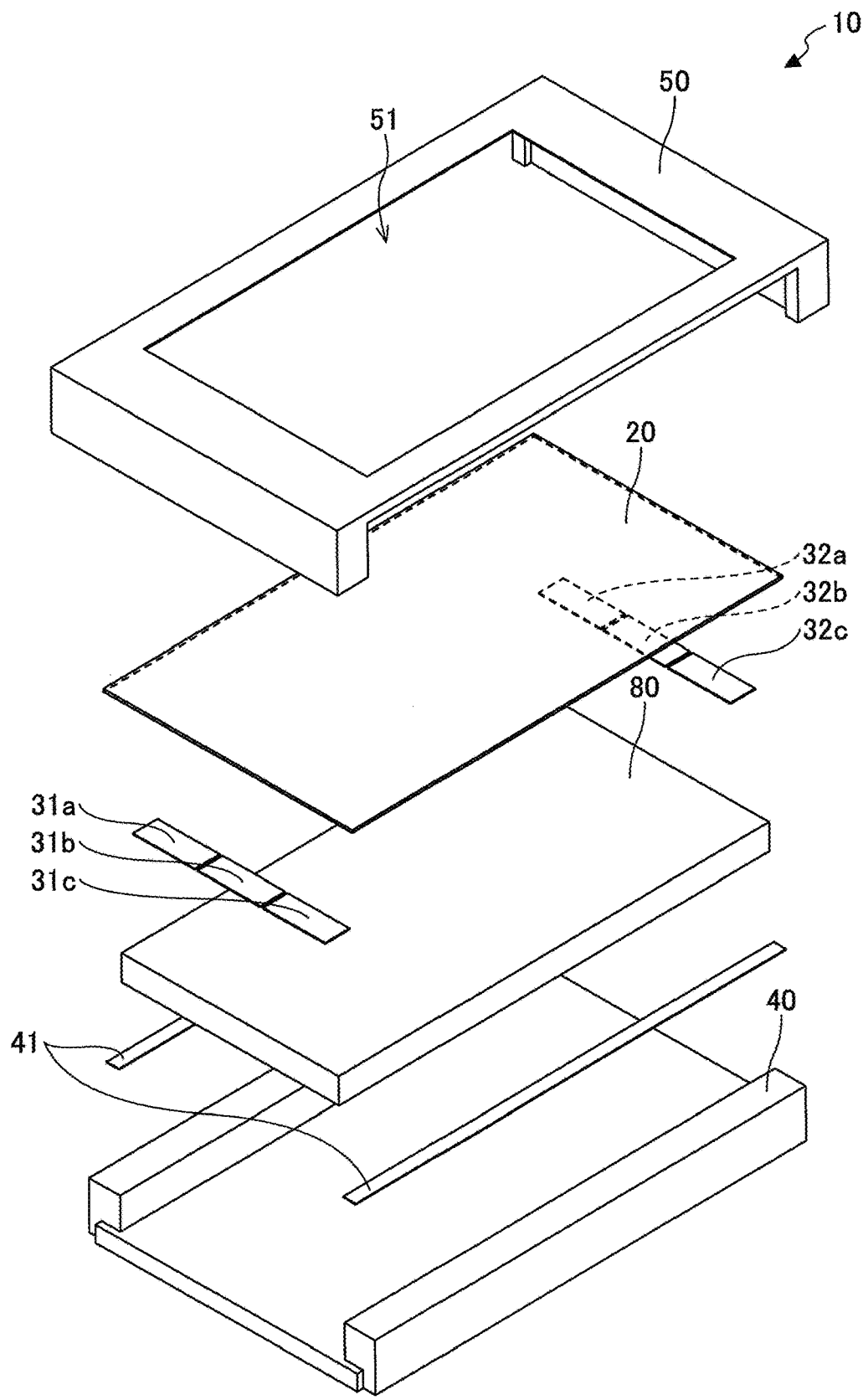
FIG. 4 is an exploded perspective view of the tactile presentation device and an information terminal device of the first embodiment.
Figure 5A:
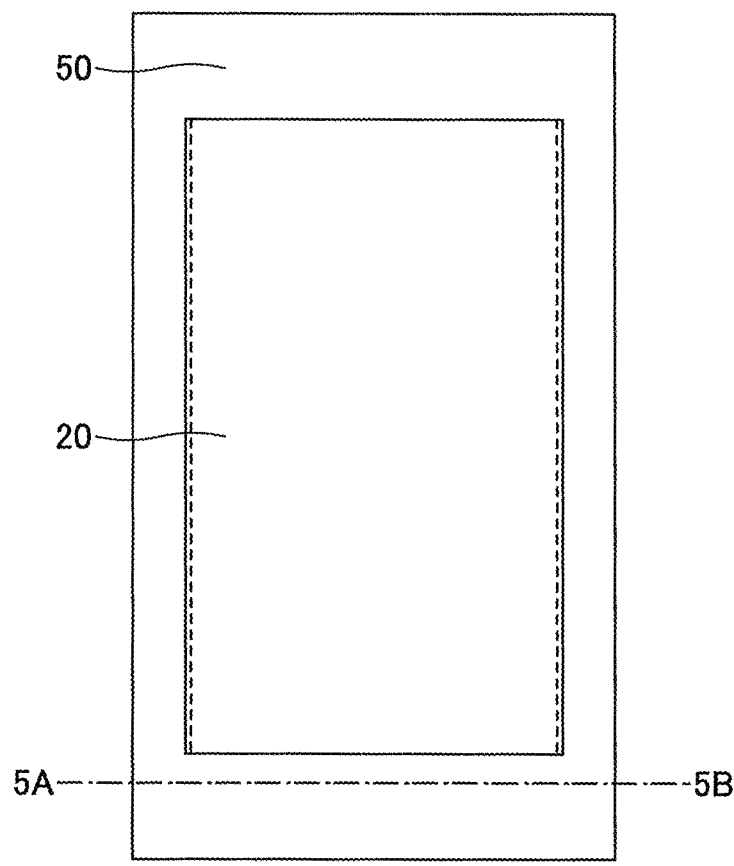
FIG. 5A and FIG. 5B are views for describing the tactile presentation device and the information terminal device of the first embodiment.

FIG. 4 is an exploded perspective view illustrating a state in which an information terminal device including a display device is incorporated in the tactile presentation device 10. FIG. 5A is a top view and FIG. 5B is a cross-sectional view taken along a chain line 5A-5B.

Figure 5B:
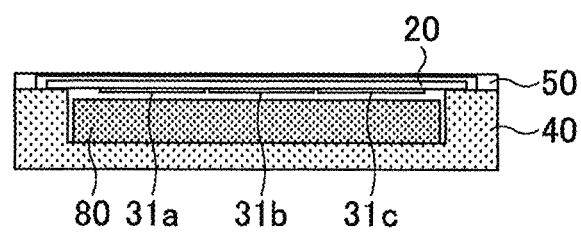

In the tactile presentation device 10 of the embodiment, as illustrated in FIG. 4 to FIG. 5B, an information terminal device 80 is provided between the panel base 40 and the panel 20.

The information terminal device 80 of the embodiment is one in which a capacitive touch panel or a resistive touch panel is provided on a display device such as a tablet. Further, it is preferable that the panel 20 is transparent in order to see a screen displayed on the information terminal device 80.

(Position Detection Function)

Next, a position detection function of a touched position when a finger touches the panel 20 of the tactile presentation device 10 of the embodiment is described based on experimental results.

The panel 20 used in an experiment is formed by a chemically strengthened glass with a size of 125 mm×64 mm and a thickness of 0.3 mm. The piezo-electric elements 31a to 31c and 32a to 32c are adhered to a back surface of the panel 20 at both short sides, respectively. Each of the piezo-electric elements 31a to 31c and 32a to 32c has a size of 18 mm×8 mm with a thickness of 3 mm. Electrode terminals extended from the piezo-electric elements 31a to 31c and 32a to 32c, respectively, are connected to an oscilloscope. In FIG. 6B, FIG. 7B, FIG. 8B, FIG. 9B, FIG. 10B, each waveform is a result measured by the oscilloscope. The experiment was conducted under a state that aluminum 10 mm square bars, corresponding to support portions of the panel base 40, were adhered near both long sides of the panel 20 at the back surface.

When a finger touches the panel 20, the panel 20 is oscillated, and this vibration is applied to each of the piezo-electric elements 31a to 31c and 32a to 32c. Each of the piezo-electric elements 31a to 31c and 32a to 32c outputs a signal corresponding to an applied vibration. As a distance from a touched point on the panel 20 to each of the piezo-electric elements 31a to 31c and 32a to 32c is different, a magnitude and amplitude of the vibration applied to each of the piezo-electric elements 31a to 31c and 32a to 32c is different in accordance with the distance. As the piezo-electric element outputs a signal with amplitude that corresponds to an applied magnitude, voltage output from each of the piezo-electric elements 31a to 31c and 32a to 32c is different in accordance with the magnitude of the vibration. Further, as the distance between the touched point and each of the piezo-electric elements 31a to 31c and 32a to 32c is different, there is a difference in time necessary for the vibration to be applied on each of the piezo-electric elements 31a to 31c and 32a to 32c after the finger touches the panel 20. Thus, there is a difference in time necessary for each of the piezo-electric elements 31a to 31c and 32a to 32c to output the respective voltage in accordance with the difference in time necessary for the vibration to be applied on each of the piezo-electric elements 31a to 31c and 32a to 32c. In this embodiment, the touched position on the panel 20 is detected by using the voltage value output from each of the piezo-electric elements 31a to 31c and 32a to 32c and the difference in time necessary for each of the piezo-electric elements 31a to 31c and 32a to 32c to output the voltage.

Figure 6A:
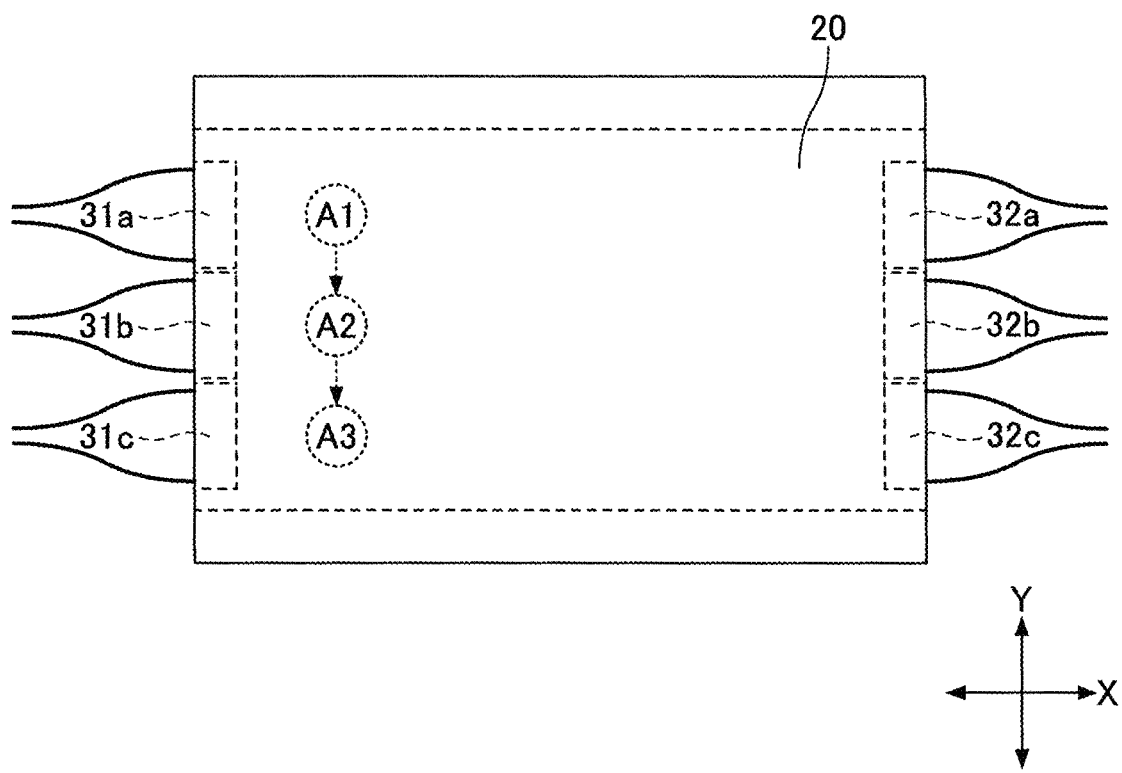
FIG. 6A and FIG. 6B are views for describing a function of the tactile presentation device of the first embodiment.
Figure 6B:
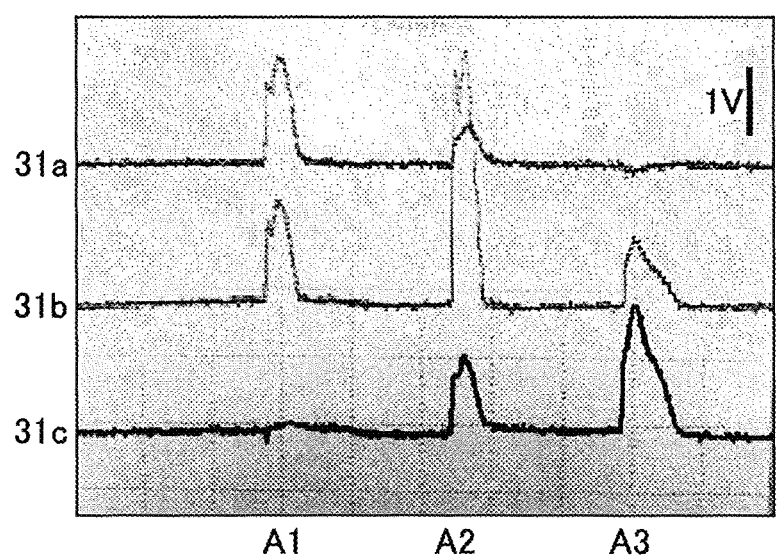

FIG. 6A and FIG. 6B are views for describing a state when the panel 20 is tapped by a finger at different positions in the Y direction. FIG. 6A is a top view of the panel 20, and FIG. 6B illustrates waveforms output from the piezo-electric elements 31a, 31b and 31c, respectively. In FIG. 6B, a lateral axis indicates time, and a vertical axis indicates voltage output from each of the piezo-electric elements 31a to 31c. This is the same in other drawings as well.

As illustrated in FIG. 6A, when the panel 20 is tapped by a finger at its left-side from an upper to lower direction, at positions "A1", "A2" and "A3" in this order, outputs as illustrated in FIG. 6B are obtained from the piezo-electric element 31a, 31b and 31c, respectively, provided at the left-side of the panel 20.

As illustrated in FIG. 6B, when the position "A1" on the panel 20 is tapped, an output of the piezo-electric element 31a that is provided at the nearest to the position "A1" is the largest, an output of the piezo-electric element 31b is the next largest, and an output of the piezo-electric element 31c is the minimum. In the example of FIG. 6B, the output of the piezo-electric element 31c is very small. Then, when the position "A2" on the panel 20 is tapped, outputs are obtained from all of the piezo-electric elements 31a, 31b and 31c, respectively, and an output of the piezo-electric element 31b that is provided at the nearest to the position "A2" is the largest. Further, when the position "A3" on the panel 20 is tapped, an output of the piezo-electric element 31c that is provided at the nearest to the position "A3" is the largest, an output of the piezo-electric element 31b is the next largest, and an output of the piezo-electric element 31a that is provided at the furthest from the position "A3" is very small.

As such, among the piezo-electric elements 31a to 31c, an output from the piezo-electric element that is the nearest to the tapped position becomes the largest, and an output from the piezo-electric element decreases as departing from the tapped position. Thus, it can be understood that a touched position of a finger in the Y direction can be detected by comparing outputs obtained from the piezo-electric elements 31a to 31c that are aligned in the Y direction, respectively.

For the case of FIG. 6A and FIG. 6B, a position near the piezo-electric element from which the maximum output was obtained can be detected as a touched position of the finger. In this embodiment, the plurality of piezo-electric elements 31a to 31c and 32a to 32c are respectively aligned in the Y direction for determining the position in the Y direction as described above. Here, a detection accuracy of the touched position in the Y direction may be varied based on the number of piezo-electric elements to be aligned.

Output voltages of the piezo-electric elements 32a to 32c have tendency same as those illustrated in FIG. 6B. However, as the positions "A1" to "A3" are close to the left-side of the panel 20, the piezo-electric elements 32a to 32c are further from the tapped position compared with the piezo-electric elements 31a to 31c. Thus, the output voltages of the piezo-electric elements 32a to 32c become smaller than the voltages illustrated in FIG. 6B, respectively. Thus, the outputs of piezo-electric elements 32a to 32c are not illustrated in FIG. 6B. On the other hand, when the panel 20 is tapped at its right-side panel 20, outputs from the piezo-electric elements 32a to 32c become larger. It is possible to detect a tapped position in the Y direction by using either of the piezo-electric elements 31a to 31c and the piezo-electric elements 32a to 32c whose outputs are larger. Alternatively, the tapped position in the Y direction may be detected by comparing outputs of the piezo-electric elements 31a to 31c and outputs of the piezo-electric elements 32a to 32c.

As sensitivity and characteristics are different for each piezo-electric element, outputs of the piezo-electric elements may be varied. Further, even when a finger touches a same position, vibration may be varied due to factors such as applied forces and the like. Thus, the touched position may be detected using a ratio of outputs of the piezo-electric elements and the like.

Further, the piezo-electric element outputs voltage in accordance with applied pressure. Thus, when a finger touches the panel 20, the finger is released from the panel 20 or the touched position is varied, as the output voltage from the piezo-electric element varies and it is possible to detect the touching. However, when the pressure does not change, voltage is not output from the piezo-electric element due to its characteristics. Thus, when the output of the piezo-electric element is varied, it is determined that the finger is positioned at the same position.

Figure 7A:
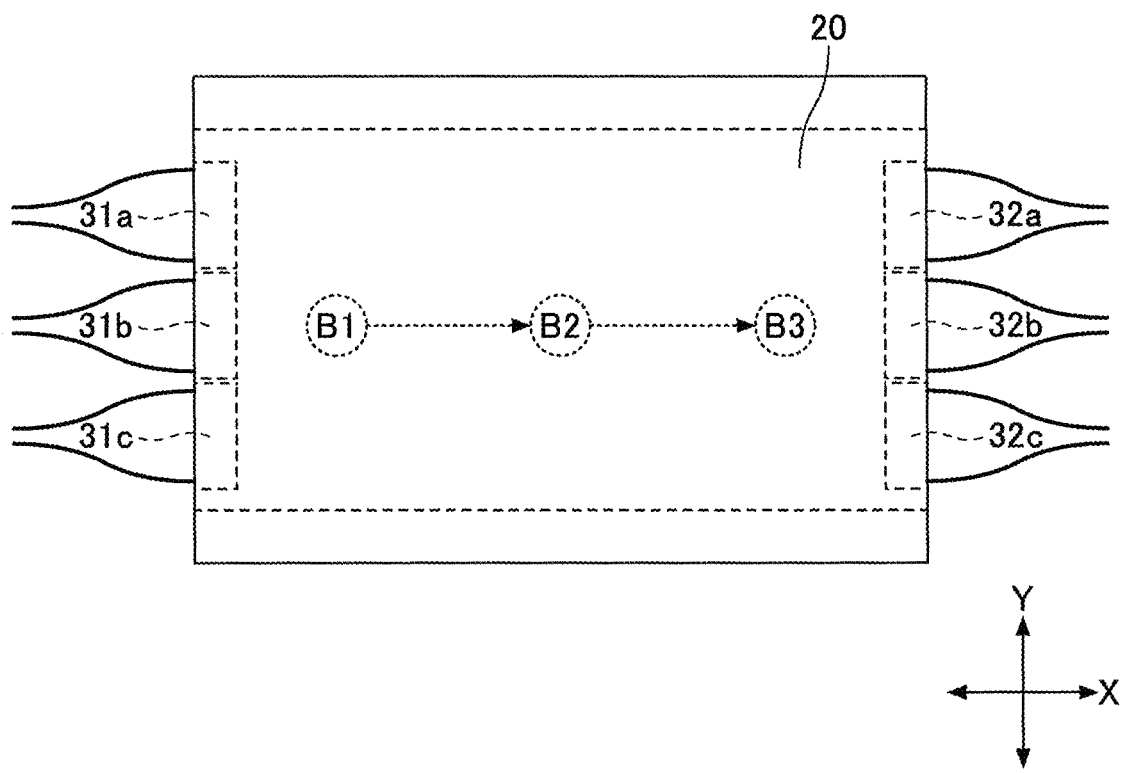
FIG. 7A and FIG. 7B are views for describing a function of the tactile presentation device of the first embodiment.
Figure 7B:
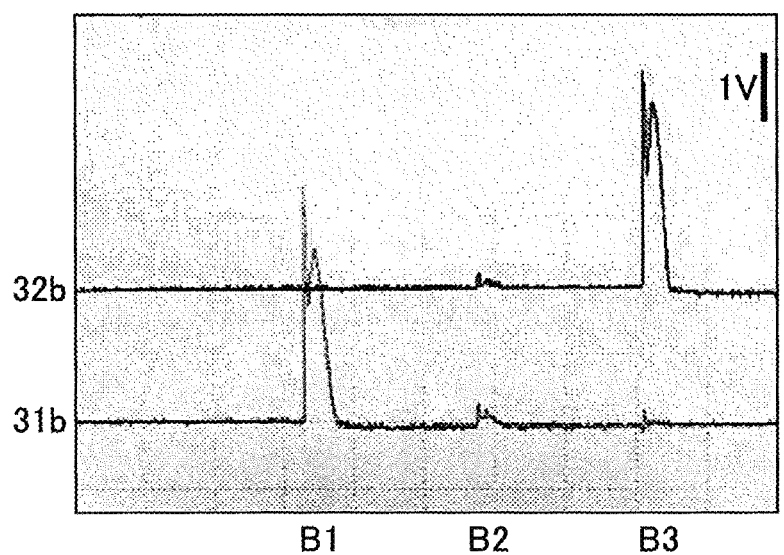

FIG. 7A and FIG. 7B are views for describing a state when the panel 20 is tapped by a finger at different positions in the X direction. FIG. 7A is a top view of the panel 20, and FIG. 7B illustrates waveforms output from the piezo-electric elements 31b and 32b, respectively.

As illustrated in FIG. 7A, when the panel 20 is tapped by a finger at its center portion in the Y direction from left to right, at positions "B1", "B2" and "B3" in this order, outputs as illustrated in FIG. 7B are obtained from the piezo-electric elements 31b and 32b, respectively.

As illustrated in FIG. 7B, as the piezo-electric element 31b is close to the position "B1" compared with the piezo-electric element 32b, when the position "B1" on the panel 20 is tapped, an output of the piezo-electric element 31b is larger than an output of the piezo-electric element 32b. Further, as the piezo-electric element 32b is close to the position "B3" compared with the piezo-electric element 31b, when the position "B3" on the panel 20 is tapped, the output of the piezo-electric element 32b is larger than the output of the piezo-electric element 31b. Further, as the position "B2" is positioned almost at a midpoint of the piezo-electric elements 31b and 32b, when the position "B2" on the panel 20 is tapped, almost same output voltages are obtained from both of the piezo-electric elements 31b and 32b. However, at this time, an output of the piezo-electric element 31b is smaller than the output that is obtained when the position "B1" is tapped, and similarly, an output of the piezo-electric element 32b is smaller than the output that is obtained when the position "B3" is tapped.

As such, by comparing magnitudes of the output voltages from the piezo-electric elements 31b and 32b, a touched position of the finger in the X direction can be determined. In the example of FIG. 7A and FIG. 7B, the touched position of the finger in the X direction can be detected in accordance with a fact which of the magnitudes of the outputs of the piezo-electric elements 31b and 32b is larger than that of the other one.

The piezo-electric element 31b is the closest, among the piezo-electric elements 31a to 31c, to the positions "B1" to "B3" in the Y direction. Similarly, the piezo-electric element 32b is the closest, among the piezo-electric elements 32a to 32c, to the positions "B1" to "B3" in the Y direction. As the closer to the touched position, the larger the output of the piezo-electric element becomes, in FIG. 7B, only the outputs from the piezo-electric elements 31b and 32b, whose voltages become the largest in the example of FIG. 7A, are illustrated and may be used. For example, when a tapped position is positioned at an upper side on the panel in the Y direction, outputs of the piezo-electric elements 31a and 32a become larger than outputs from the rest of piezo-electric elements 31b, 31c, 32b and 32c. Thus, in such a case, the outputs of the piezo-electric elements 31a and 32a may be used.

Although absolute values of output voltages are different, each of the piezo-electric elements 31a and 31c outputs a voltage that has the same tendency as that of the piezo-electric element 31b. Similarly, each of the piezo-electric elements 32a and 32c outputs a voltage that has the same tendency as that of the piezo-electric element 32b. Thus, the touched position may be determined using the output voltages from these piezo-electric elements. Here, only outputs that become the largest may be used, or alternatively all of the outputs may be used.

It can be understood, from FIG. 6A and FIG. 6B, and FIG. 7A and FIG. 7B, that a position at which the finger touches in each of the X direction and the Y direction can be determined by comparing output voltages from the piezo-electric elements 31a to 31c and 32a to 32c. In other words, the touched position in the X direction can be determined by comparing magnitudes of outputs between the piezo-electric elements 31a to 31c, and the piezo-electric elements 32a to 32c. Further, the touched position in the Y direction can be determined by comparing magnitudes of outputs between the piezo-electric element 31a or 32a, the piezo-electric element 31b or 32b and the piezo-electric element 31c or 32c, respectively. By combining the determination of the touched position in the Y direction of FIG. 6A and FIG. 6B, and the determination of the touched position in the X direction of FIG. 7A and FIG. 7B, it is possible to determine at which point on the panel 20 the finger touches.

Figure 8A:
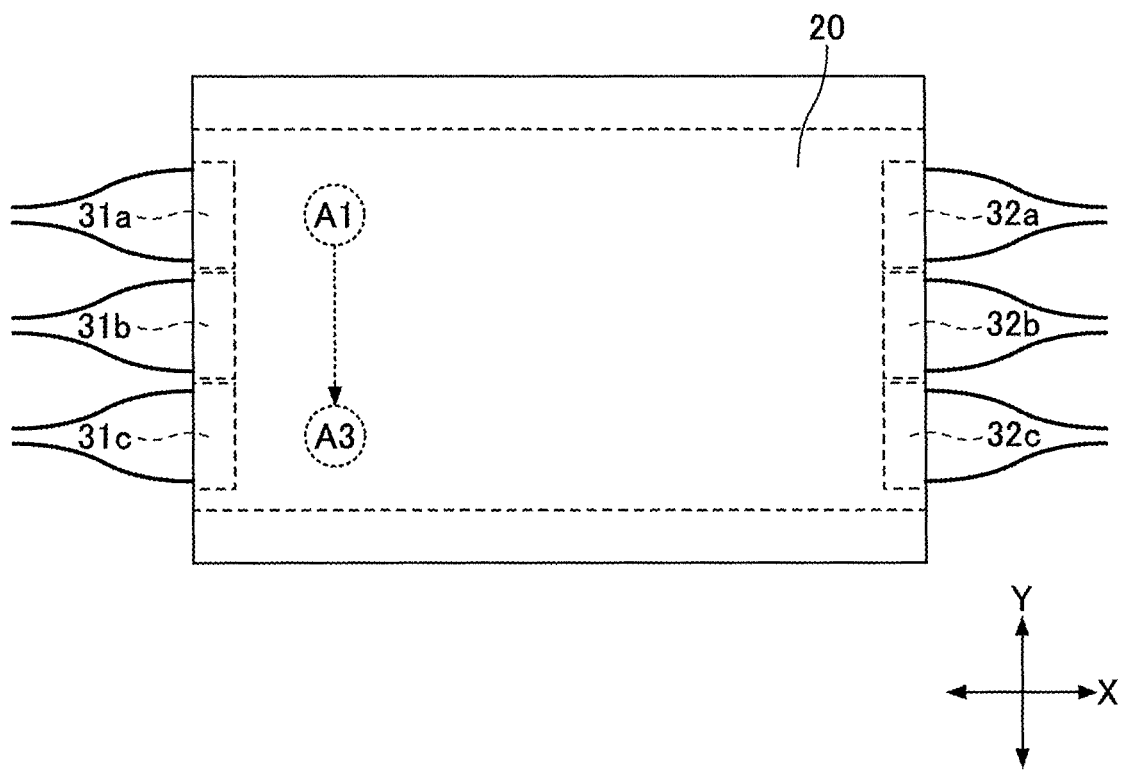
FIG. 8A and FIG. 8B are views for describing a function of the tactile presentation device of the first embodiment.
Figure 8B:
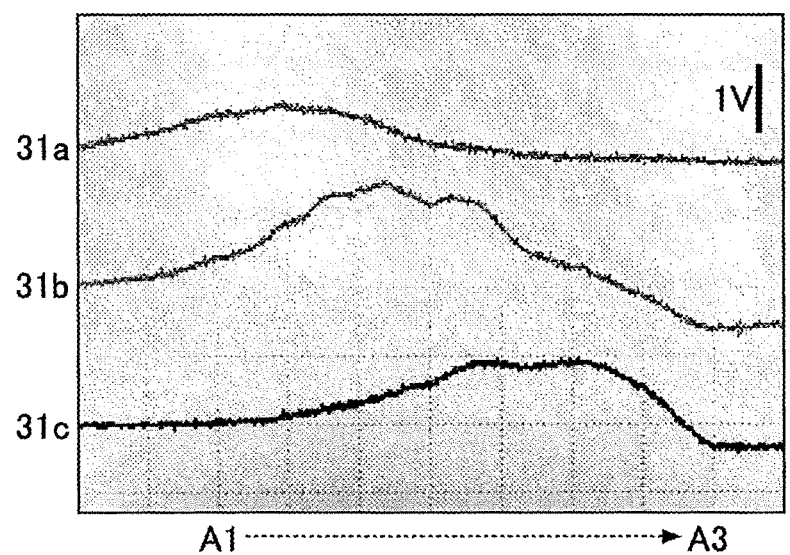

FIG. 8A and FIG. 8B are views for describing a state when a finger is moved on the panel 20 in the Y direction. FIG. 8A is a top view of the panel 20, and FIG. 8B illustrates waveforms output from the piezo-electric elements 31a to 31c, respectively.

As illustrated in FIG. 8A, when the finger is moved at the left-side of the panel 20 from an upper-side to a lower-side, in other words, from the position "A1" to the position "A3", outputs as illustrated in FIG. 8B are obtained from the piezo-electric elements 31a to 31c, respectively. As the finger is moved while continuously touching the panel 20 in the case of FIG. 8A and FIG. 8B, variation of the waveforms in FIG. 8B is different from that illustrated in FIG. 6B.

As illustrated in FIG. 8B, while the finger is moved on the panel 20 from the position "A1" to the position "A3", when the finger is positioned near the position "A1", an output of the piezo-electric element 31a is the largest. Then, by moving the finger toward the positions "A2" and "A3", the output from the piezo-electric element 31a decrease, and outputs from the piezo-electric elements 31b and 31c gradually increase. When the finger is near a midpoint of the positions "A1" and "A3", the output of the piezo-electric element 31b becomes the largest. Thereafter, when the finger is further moved toward the position "A3", the outputs of the piezo-electric elements 31a and 31b decrease, and the output of the piezo-electric element 31c increases. When the finger is close to the piezo-electric element 31c, the output of the piezo-electric element 31c becomes the largest.

By detecting a phenomenon that the piezo-electric element whose output becomes the maximum changes from the piezo-electric element 31a, the piezo-electric element 31b and the piezo-electric element 31c in this order, a state that the finger touching the panel 20 is moving from the positions "A1" to "A3", in other words, from the upper-side to the lower-side in the Y direction can be detected. Further, a moving speed of the finger can be determined based on the time course of this change.

Here, as can be understood from the comparison between FIG. 6B and FIG. 8B, it is possible to determine whether the plurality of positions are separately tapped, or whether the finger move from a point to another point while continuously touching the panel 20 based on the change of the outputs of the piezo-electric elements.

Figure 9A:
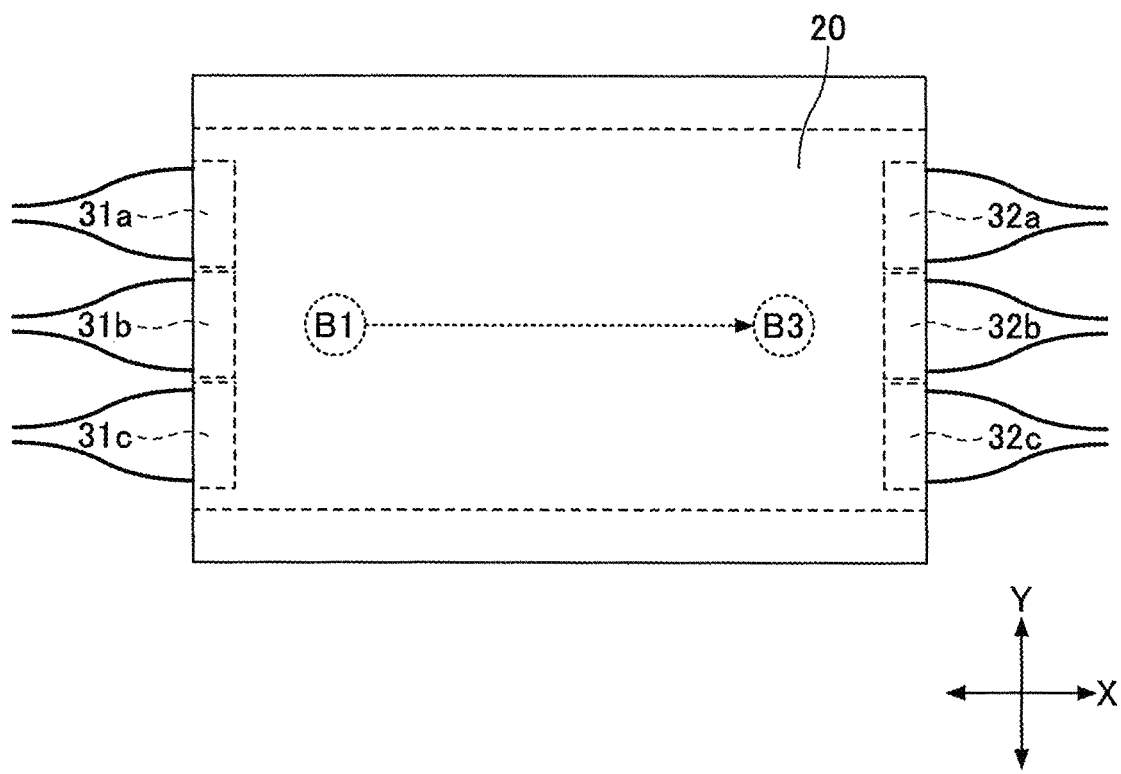
FIG. 9A and FIG. 9B are views for describing a function of the tactile presentation device of the first embodiment.
Figure 9B:
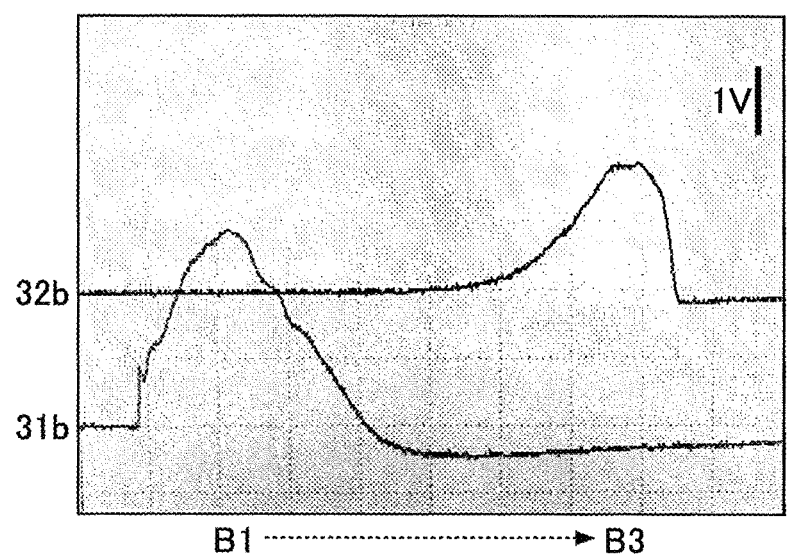

FIG. 9A and FIG. 9B are views for describing a state when a finger is moved at a center portion of the panel 20 in the X direction. FIG. 9A is a top view of the panel 20, and FIG. 9B illustrates waveforms output from the piezo-electric elements 31b and 32b, respectively.

As illustrated in FIG. 9A, when the finger is moved at the center portion of the panel 20 from the left-side to the right-side, in other words, from the position "B1" to the position "B3" in the X direction, outputs as illustrated in FIG. 9B are obtained.

As illustrated in FIG. 9B, while the finger is moved on the panel 20 from the position "B1" to the position "B3", when the finger is positioned near the position "B1", an output of the piezo-electric element 31b is the largest. Then, by moving the finger toward the position "B3", the output of the piezo-electric element 31b decreases, and an output of the piezo-electric element 32b increases. When the finger is near the position "B3", the output of the piezo-electric element 32b becomes the largest.

By detecting a phenomenon that the piezo-electric element whose output becomes the maximum changes from the piezo-electric element 31b to the piezo-electric element 32b, a state that the finger touching the panel 20 is moving from the positions "B1" to "B3", in other words, from the left-side to the right-side in the X direction can be detected.

Figure 10A:
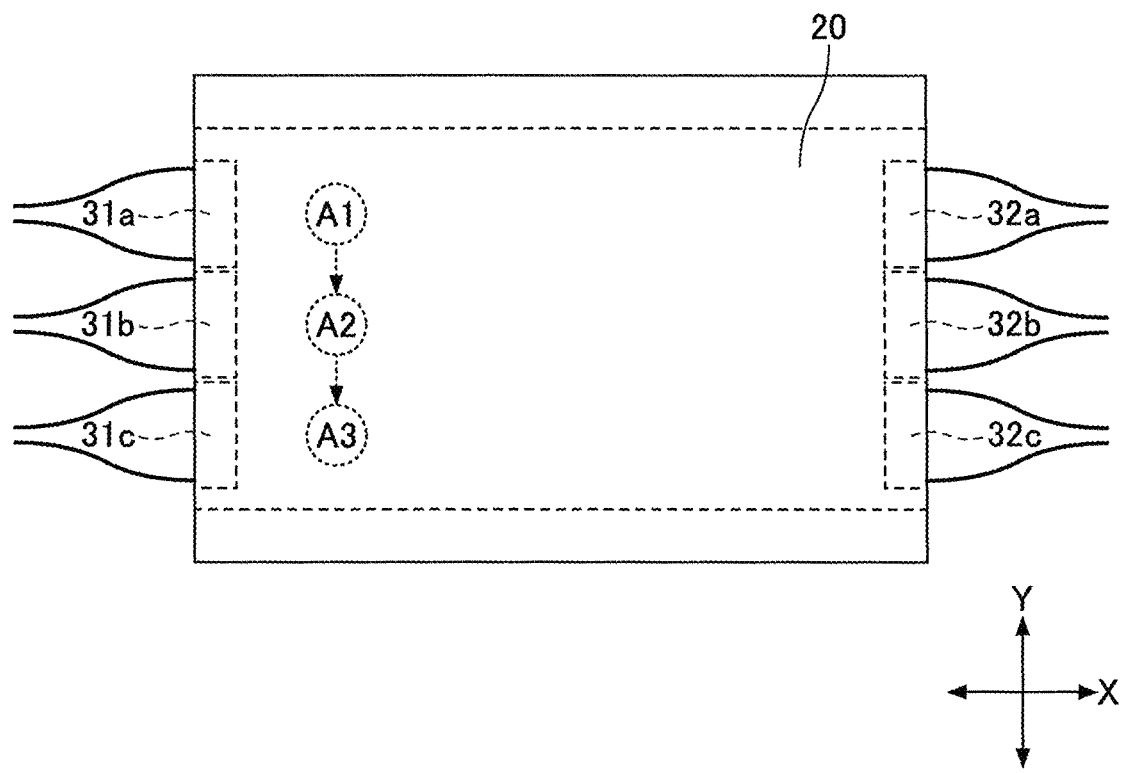
FIG. 10A and FIG. 10B are views for describing a function of the tactile presentation device of the first embodiment.
Figure 10B:
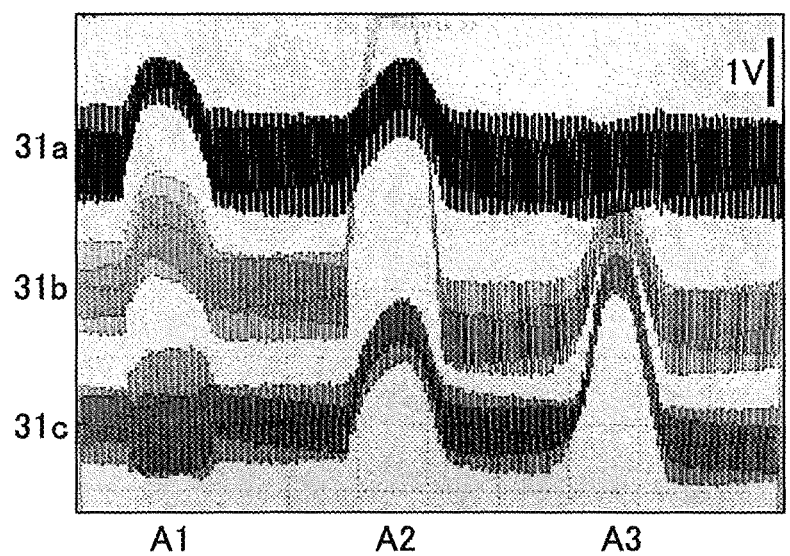

FIG. 10A and FIG. 10B are views for describing a state when the panel 20 is tapped by a finger at different positions in the Y direction while the piezo-electric elements are vibrated by supersonic. FIG. 10A is a top view of the panel 20, and FIG. 10B illustrates waveforms output from the piezo-electric elements 31a to 31c, respectively. As the piezo-electric elements are vibrated by supersonic in FIG. 10A and FIG. 10B, a signal of supersonic band having certain amplitude is applied to each of the piezo-electric elements. This is the reason that each of the signals (outputs) has a width in FIG. 10B.

As illustrated in FIG. 10A, while the piezo-electric elements 31a to 31c are vibrated by supersonic, when the panel 20 is tapped by a finger at its left-side from the upper-side to the lower-side, at the positions "A1", "A2" and "A3" in this order, outputs as illustrated in FIG. 10B are obtained from the piezo-electric elements 31a to 31c, respectively. Here, in FIG. 10A, the left-side of the panel 20 is tapped.

As illustrated in FIG. 10B, even when the piezo-electric elements 31a to 31c are vibrated by supersonic, each of the piezo-electric elements 31a to 31c detects the pressure that is generated when being tapped and outputs voltage corresponding to the pressure. Thus, when the panel 20 is tapped by the finger, the signal generated at each of the piezo-electric elements overlap the signal that drives the respective piezo-electric element, and the output of the piezo-electric element changes. In the case of FIG. 10B as well, the output of the piezo-electric element that is near the tapped position changes largely.

Here, a frequency band for vibrating the piezo-electric element, and a frequency band of the output of the piezo-electric element due to the touching on the panel 20 are different. While the frequency of the signal for vibrating each of the piezo-electric elements 31a to 31c by supersonic is around 100 kHz, a frequency of the output generated at each of the piezo-electric elements 31a to 31c due to the touching on the panel 20 is relatively a low frequency. Thus, by removing a high-frequency component from the output of the piezo-electric element by passing the output of the piezo-electric element through a low-pass filter, the output voltage of the piezo-electric element generated by the tapping on the panel 20 can be obtained. Thus, the position of the panel 20 tapped by the finger can be detected using the voltage. Further, the output voltage of the piezo-electric element generated by the tapping can be obtained by obtaining a difference between the output of the piezo-electric element, and the signal that drives the piezo-electric element.

As such, as there is a different between the vibration of the piezo-electric element and a variation method by tapping, it is possible to detect a touched position by using the piezo-electric elements while continuously vibrating the piezo-electric elements. Thus, a control to time-divide a period for vibrating the piezo-electric elements and a period for detecting a touched position by the piezo-electric elements is unnecessary.

Here, it is possible to detect a fact that the panel 20 is tapped by using the waveforms of FIG. 10B without using a low-pass filter or the like.

(Method of Controlling)

Figure 12A:
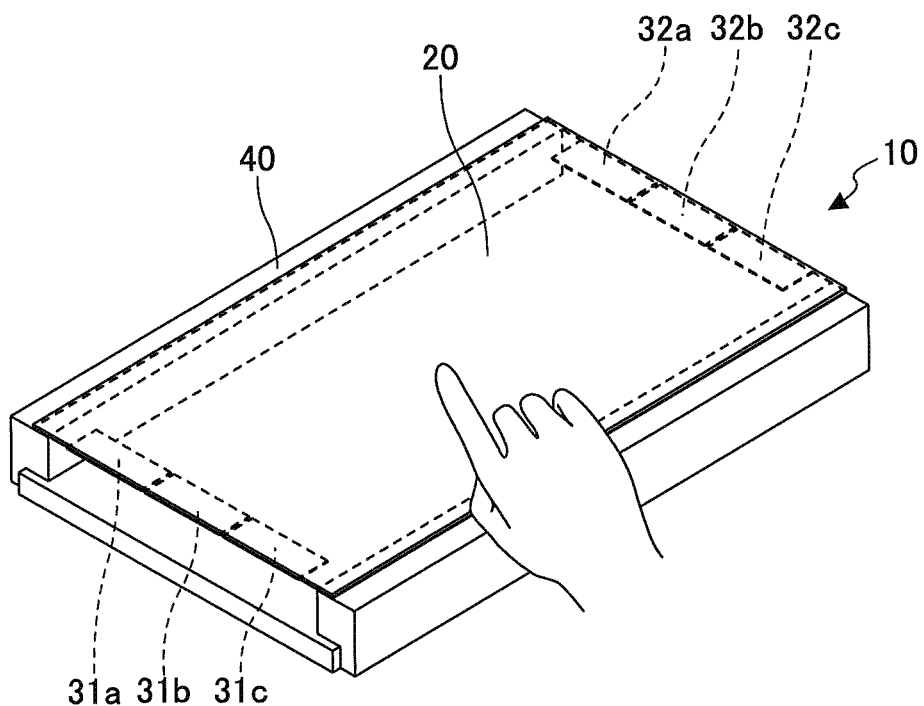
FIG. 12A and FIG. 12B are views for describing the method of controlling the tactile presentation device of the first embodiment.
Figure 12B:
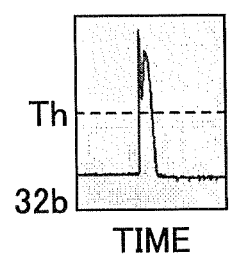

Next, a method of controlling the tactile presentation device 10 is described with reference to FIG. 11. Processes illustrated in FIG. 11 are for returning each of the information terminal device 80 and the tactile presentation device 10 from a sleep state, when a finger touches the panel 20 while each of the information terminal device 80 and the tactile presentation device 10 is at a sleep state. Here, it is assumed that each of the information terminal device 80 and the tactile presentation device 10 is at either of an activated state and the sleep state, and a power of each of the information terminal device 80 and the tactile presentation device 10 it not completely off. FIG. 12A illustrates a state in which a finger touches the tactile presentation device 10, and FIG. 12B illustrates a waveform of an electrical signal generated from the piezo-electric element 32b.

Here, the following processes are basically performed by the control unit 70.

First, in S102, a voltage value output from the piezo-electric element is detected by using the detection unit 62. This is also a process for determining whether a finger touches the panel 20. At this time, a voltage value output from one of the specific piezo-electric elements may be detected, or alternatively, voltage values output from a plurality of the piezo-electric elements may be respectively detected.

Next, in S104, whether the tactile presentation device 10 is at the sleep state is determined. When the tactile presentation device 10 is not at the sleep state (NO in step S104), in other words, when the tactile presentation device 10 is at the activated state, as it is unnecessary to return from the sleep state, the processes of FIG. 11 are finished. On the other hand, when the tactile presentation device 10 is at the sleep state (YES in step S104), the process proceeds to S106. Whether the tactile presentation device 10 is at the sleep state may be stored in the memory of the control unit 70, for example.

Next, in S106, whether the voltage value of the piezo-electric element measured in S102 is greater than or equal to a threshold value "Th" is determined. FIG. 12B illustrates a state in which a voltage value of an electrical signal generated from the piezo-electric element 32b is greater than or equal to the threshold value "Th". When the measured voltage of the piezo-electric element is greater than or equal to the threshold value "Th", the control unit 70 determines that the finger touches the panel 20 with force that is greater than or equal to a certain amount, and moves to S108. On the other hand, when the voltage value is less than the threshold value "Th", the control unit 70 determines that the finger does not touch, and returns to S102. Then, an output voltage value of the piezo-electric element is measured again. The threshold value "Th" may be set such that touching on the panel 20 is appropriately detected.

When it is determined that the voltage value is greater than or equal to the threshold value "Th" in S106, as illustrated in S108, the control unit 70 returns each of the tactile presentation device 10 and the information terminal device 80 from the sleep state to the activated state. Then, the processes of FIG. 11 are finished.

As such, by detecting whether the finger touches the panel 20 by the piezo-electric element(s), the tactile presentation device 10 and the information terminal device 80 can be returned from the sleep state without using a touch panel or the like.

Second Embodiment

Next, a second embodiment is described. According to a method of controlling the tactile presentation device 10 of the second embodiment, the information terminal device 80 and the tactile presentation device 10 are returned from the sleep state when a finger touches a specific region of the panel 20. The method of controlling the tactile presentation device 10 of the embodiment is described with reference to FIG. 13. FIG. 14A illustrates a state in which a finger touches a specific region of the panel 20, and FIG. 14B illustrates waveforms of electrical signals generated from the piezo-electric elements 31b and 32b, respectively. In FIG. 14A, the specific region "SR" is set at the left-side of the panel 20.

First, in S202, voltage values of the piezo-electric elements are respectively measured.

Next, in S204, whether the tactile presentation device 10 is at the sleep state is determined. When the tactile presentation device is at the sleep state (YES in S204), the process proceeds to S206. On the other hand, when the tactile presentation device 10 is not at the sleep state (NO in S204), the processes of FIG. 13 are finished.

Next, in S206, whether the voltage value of each of the piezo-electric elements measured in S202 is greater than or equal to a threshold value "Th" is determined. FIG. 14B illustrates a comparison between outputs of the piezo-electric elements 31b and 32b when a finger touches the specific region "SR" and the threshold value "Th". When the measured voltage value output from at least one of the piezo-electric elements is greater than or equal to the threshold value "Th" (YES in S206), the control unit 70 determines that the finger touches the panel 20 and proceeds to S208. On the other hand, when the measured voltage value output from each of the piezo-electric elements is less than the threshold value "Th" (NO in S206), the control unit determines that the finger does not touch the panel 20 and returns to S202.

When it is determined that the output voltage of the piezo-electric element is greater than or equal to the threshold value "Th" in S206 (YES in S206), in S208, a position of the finger touching the panel 20 is determined based on the voltage values measured in S202. Specifically, the position on the panel 20 at which the finger touches is determined by a ratio of the output voltage values of the piezo-electric elements 31b and 32b. As the specific region "SR" is positioned at the left-side of the panel 20, when the finger touches the specific region "SR", as illustrated in FIG. 14B, in particular, the output voltage of the piezo-electric element 31b becomes greater than or equal to the threshold value "Th". Thus, by comparing the output voltages of the piezo-electric elements 31b and 32b, and for the case of FIG. 14B, it can be determined that the finger touches the left-side of the panel 20.

Figure 13:
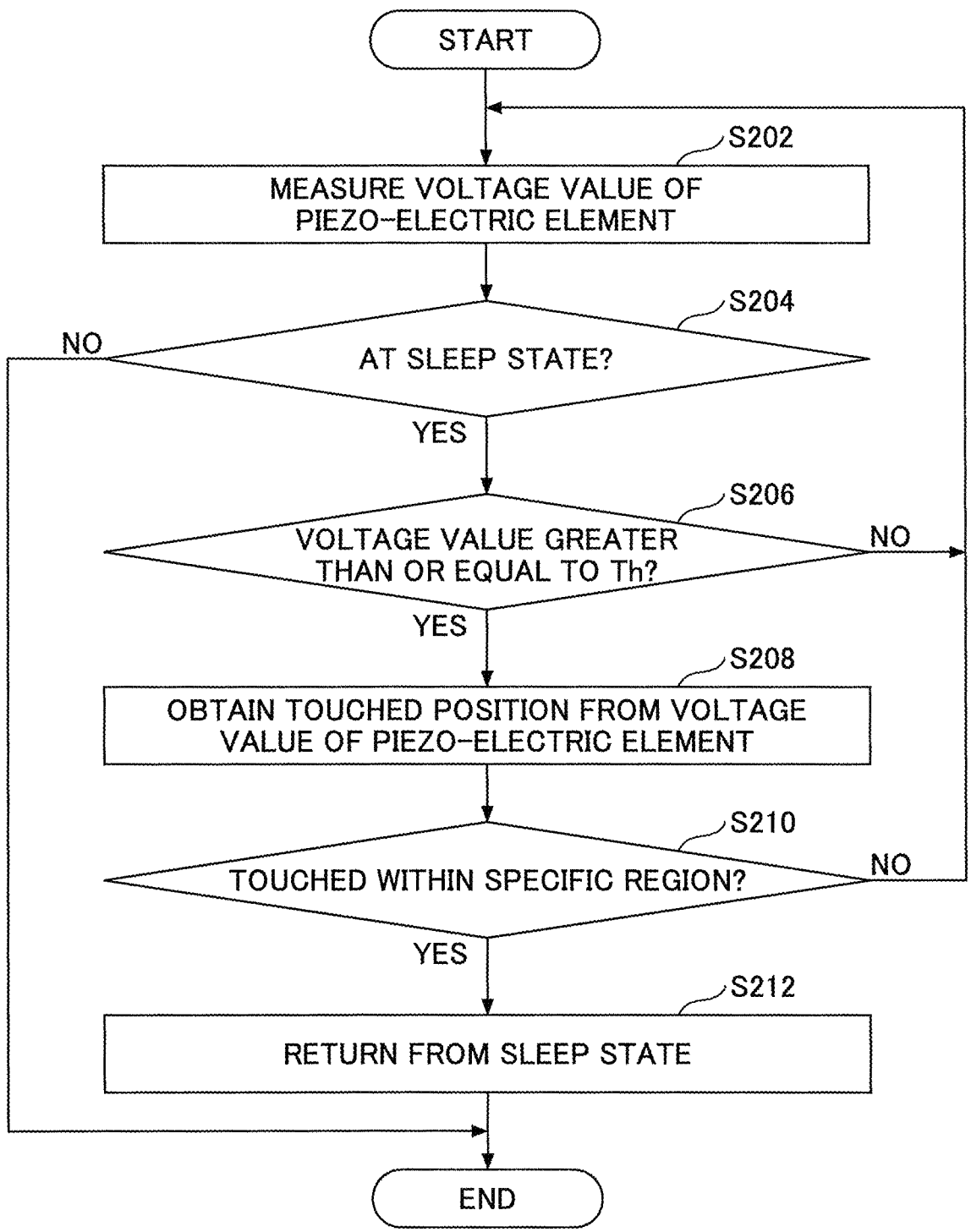
FIG. 13 is a flowchart of a method of controlling the tactile presentation device of a second embodiment.
Figure 14A:
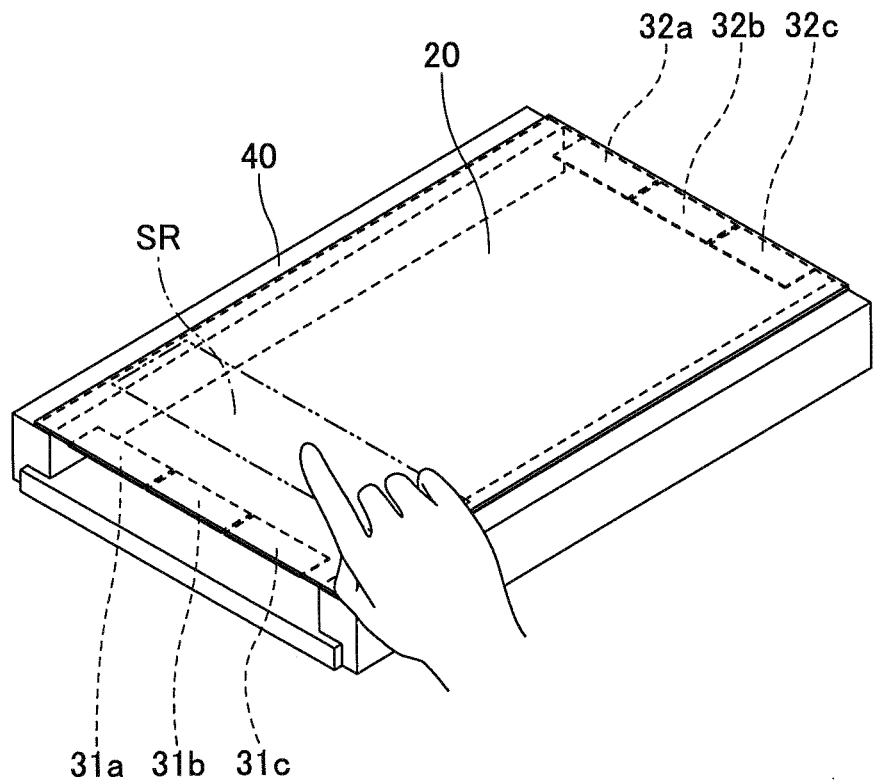
FIG. 14A and FIG. 14B are views for describing the method of controlling the tactile presentation device of the second embodiment.
Figure 14B:
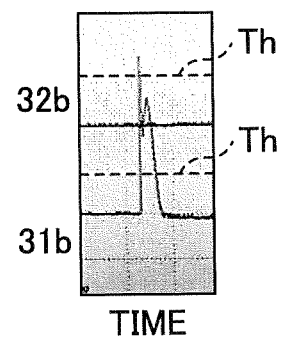

Next, in S210 of FIG. 13, whether the touched position determined in S208 is within the specific region "SR" is determined. This can be also determined based on the ratio of the outputs of the piezo-electric elements 31b and 32b. When it is determined that the touched position is within the specific region "SR" (YES in S210), the process proceeds to S212. On the other hand, when it is determined that the touched position is not within the specific region "SR" (NO in S210), the process returns to S202.

When it is determined that the finger touches the specific region "SR" in S210, each of the tactile presentation device 10 and the information terminal device 80 is returned from the sleep state to the activated state in S212, and the processes of FIG. 13 are finished.

Here, other than the above are the same as those of the first embodiment.

Third Embodiment

Figure 15:
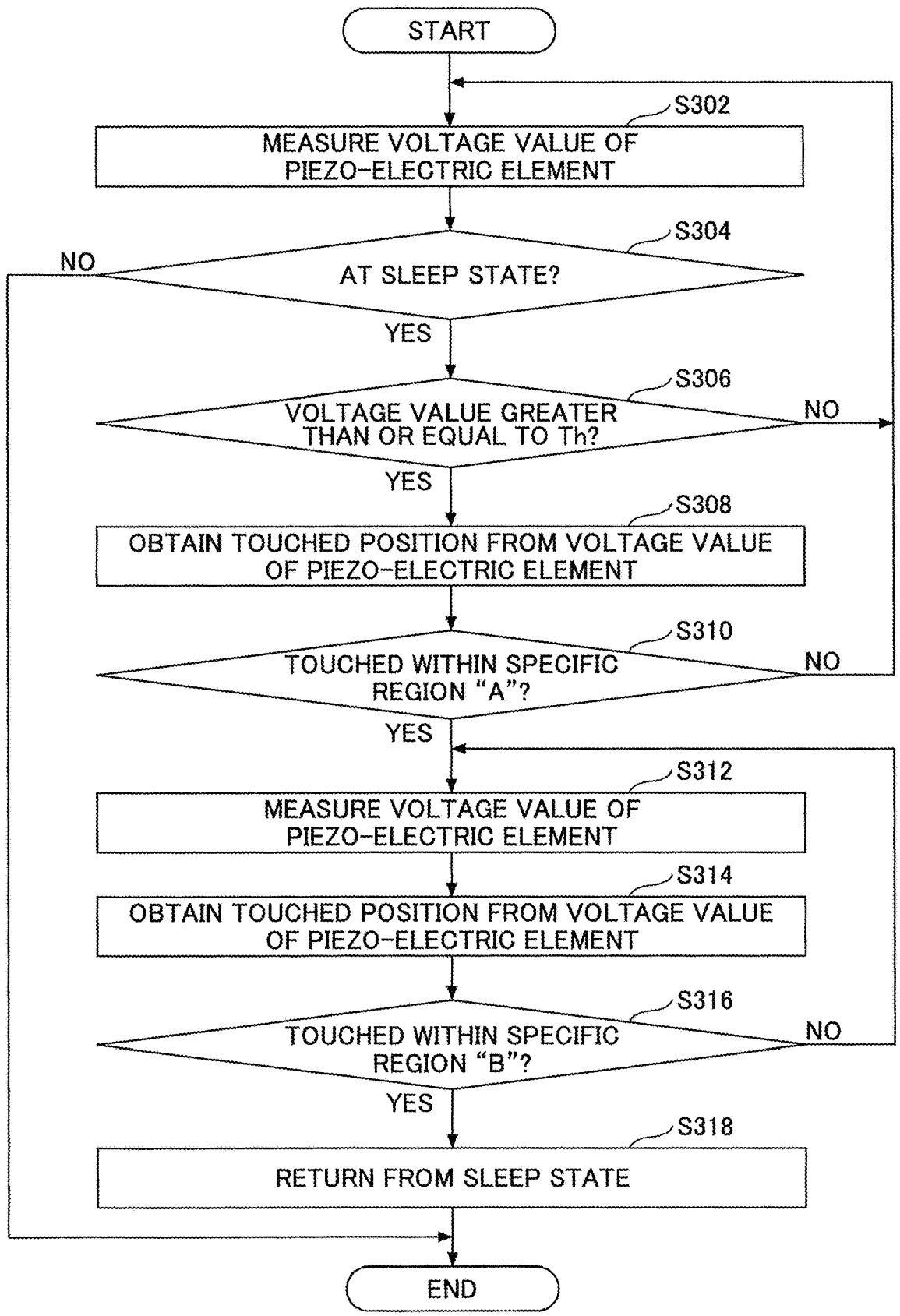
FIG. 15 is a flowchart of a method of controlling the tactile presentation device of a third embodiment.
Figure 16A:
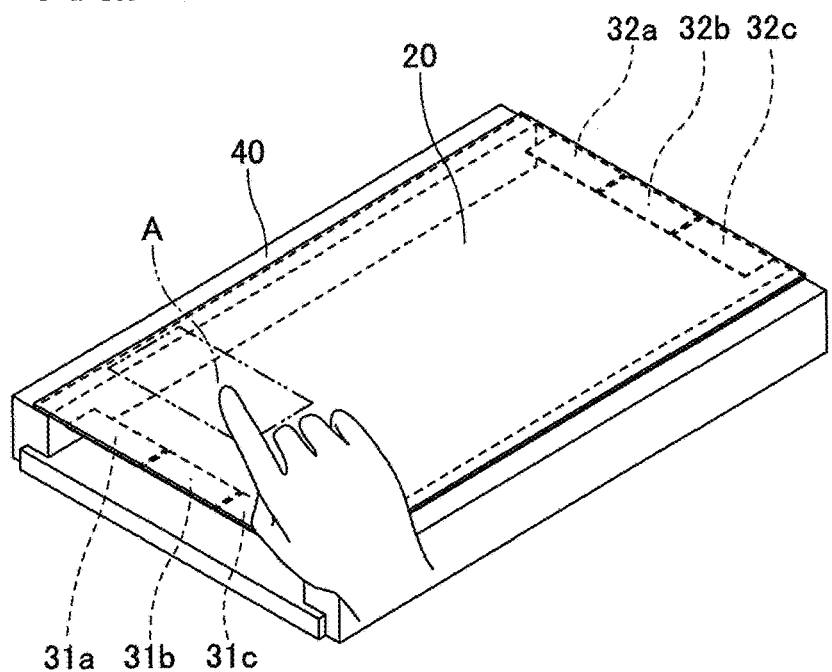
FIG. 16A to FIG. 16C are views for describing the method of controlling the tactile presentation device of the third embodiment.
Figure 16B:
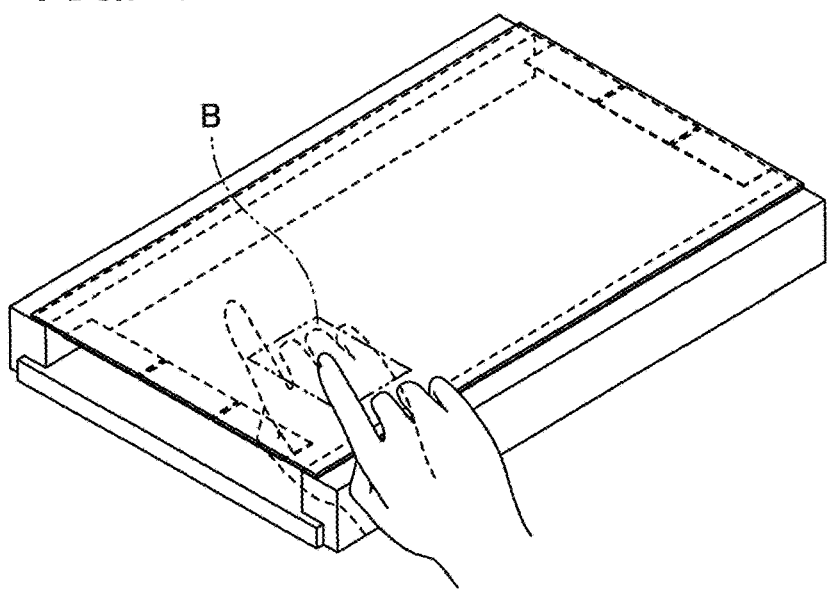
Figure 16C:
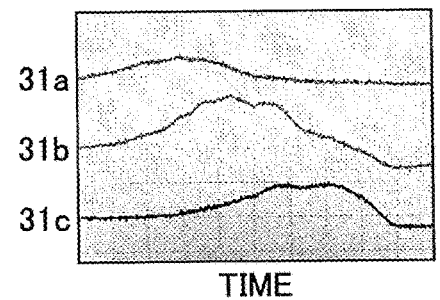

Next, a third embodiment is described. According to a method of controlling the tactile presentation device 10 of the third embodiment, the information terminal device 80 and the tactile presentation device 10 are returned from the sleep state when a finger is moved from a specific region "A" to a specific region "B" of the panel 20. The method of controlling tactile presentation device 10 is described with reference to FIG. 15. FIG. 16A illustrates a state in which a finger touches the specific region "A" of the panel 20, FIG. 16B illustrates a state in which the finger is moved to the specific region B, and FIG. 16C illustrates waveforms of electrical signals generated from the piezo-electric elements 31a to 31c, respectively, when the finger moves from the specific region "A" to the specific region "B" of the panel 20.

First, in S302, voltage values of the piezo-electric elements are respectively measured.

Next, in S304, whether the tactile presentation device 10 is at the sleep state is determined. When the tactile presentation device is at the sleep state (YES in S304), the process proceeds to S306. On the other hand, when the tactile presentation device is not at the sleep state (NO in S304), the processes of FIG. 15 are finished.

Next, in S306, whether each of the voltage values measured in S302 is greater than or equal to a threshold value "Th" is determined. When at least one of the measured voltage values is greater than or equal to the threshold value "Th" (YES in S306), the process proceeds to S308. On the other hand, when each of the measured voltage values is less than the threshold value "Th" (NO in S306), the process returns to S302.

Next, in S308, a position of the finger touching the panel 20 is determined based on the voltage values measured in S302.

Next, in S310, whether the touched position determined in S308 is within the specific region "A" is determined. When the touched position is within the specific region "A" (YES in S310), the process proceeds to S312 and voltage values of the piezo-electric elements are measured. On the other hand, when the touched position is not within the specific region "A" (NO in S310), the process returns to S302.

Next, in S314, a position of the finger touching the panel 20 is determined based on the voltage values of the piezo-electric elements measured in S312.

Next, in S316, whether the touched position determined in S314 is within the specific region "B" is determined. When the touched position is within the specific region "B" (YES in S316), the process proceeds to S318. On the other hand, when the touched position is not within the specific region "B" (NO in S316), the process returns to S312.

Next, in S318, the tactile presentation device 10 and the information terminal device 80 are returned from the sleep state to the activated state, and the processes of FIG. 15 are finished.

Here, other than the above are the same as those of the first embodiment.

Fourth Embodiment

Next, a fourth embodiment is described. According to a method of controlling the tactile presentation device 10 of the fourth embodiment, the information terminal device 80 is returned from the sleep state when a finger touches the panel 20 that is vibrated by supersonic. The method of controlling the tactile presentation device 10 of the embodiment is described with reference to FIG. 17.

Figure 18A:
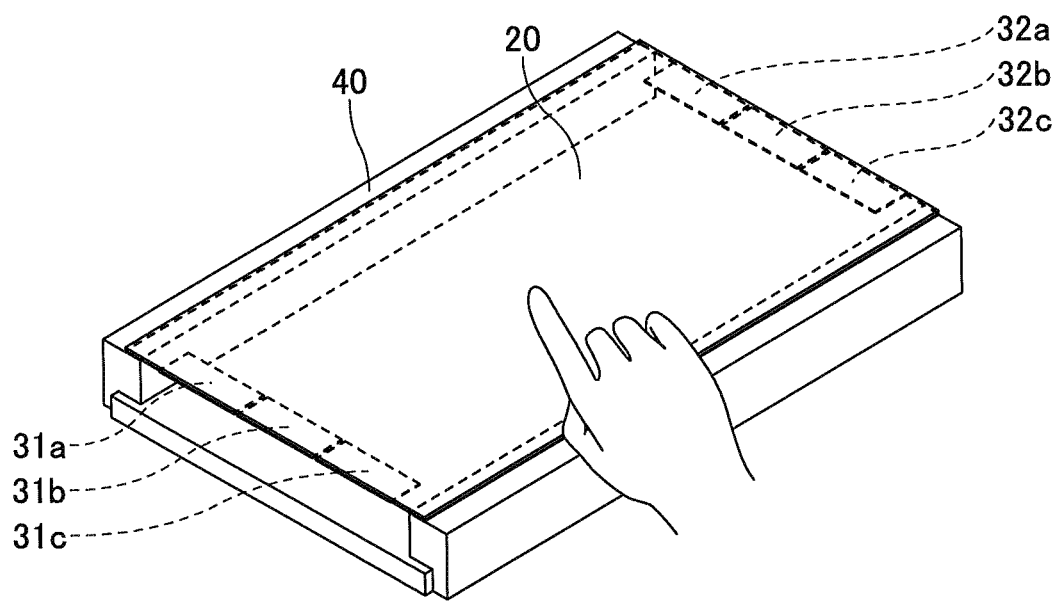
FIG. 18A to FIG. 18C are views for describing the method of controlling the tactile presentation device of the fourth embodiment.
Figure 18B:
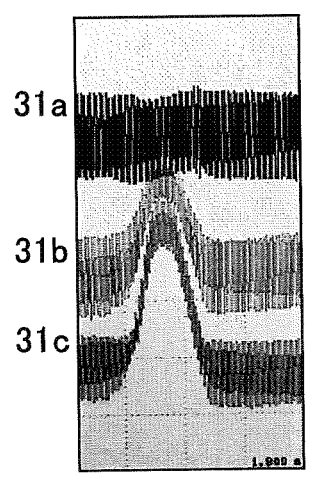
Figure 18C:
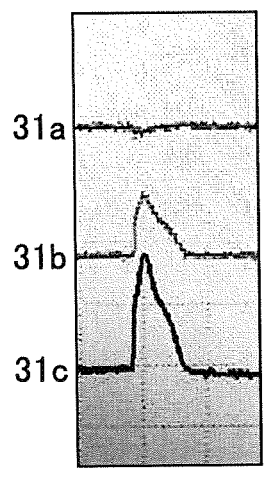

FIG. 18A illustrates a state in which a finger touches the panel 20 of the embodiment. FIG. 18B illustrates waveforms of output electrical signals of the piezo-electric elements 31a to 31c, respectively, when the finger touches the panel 20 that is vibrated by supersonic. FIG. 18C illustrates waveforms of electrical signals in which the supersonic components are removed from the outputs of the piezo-electric elements 31a to 31c, respectively.

First, in S402, voltage values of the piezo-electric elements are respectively measured.

Next, in S404, whether the piezo-electric elements are vibrated by supersonic is determined. This can be determined by whether a signal for driving each of the piezo-electric elements is applied on the respective piezo-electric element. When the piezo-electric elements are vibrated by supersonic (YES in S404), the process proceeds to S406. On the other hand, when the piezo-electric elements are not vibrated by supersonic (NO in S404), the process proceeds to S408. Here, when the piezo-electric elements are vibrated by supersonic (NO in S404), the waveforms of the electrical signals detected in S402 are the same as those illustrated in FIG. 18B.

Next, in S406, the supersonic component is removed from the electrical signal obtained from each of the piezo-electric elements. The supersonic component may be removed by passing the electrical signal through a low-pass filter to remove a high-frequency component. Alternatively, the supersonic component may be removed by obtaining a difference between the signal applied on each of the piezo-electric elements and the signal detected from each of the piezo-electric elements. By performing the process of S406, the waveforms of the electrical signals as illustrated in FIG. 18C are obtained. Here, when the piezo-electric elements are not vibrated by supersonic, as the high-frequency component is not superimposed on the output of each of the piezo-electric elements, electrical signals similarly as those illustrated in FIG. 18C are obtained in the measurement of S402. Thus, the process of S406 is unnecessary.

Next, in S408, the voltage value generated at each of the piezo-electric elements by the touching of the finger is obtained. When the piezo-electric elements are vibrated by supersonic, the voltage values of the electrical signals from which the supersonic components are respectively removed in S406 are obtained. Further, when the piezo-electric elements are not vibrated by supersonic, the voltage values of the electrical signals measured in S402 are obtained.

Next, in S410, whether each of the voltage values obtained in S408 is greater than or equal to a threshold value "Th" is determined. When at least one of the obtained voltage values is greater than or equal to the threshold value "Th" (YES in S410), the process proceeds to S412. On the other hand, when each of the obtained voltage values is less than the threshold value "Th" (NO in S410), the process returns to S402.

Figure 17:
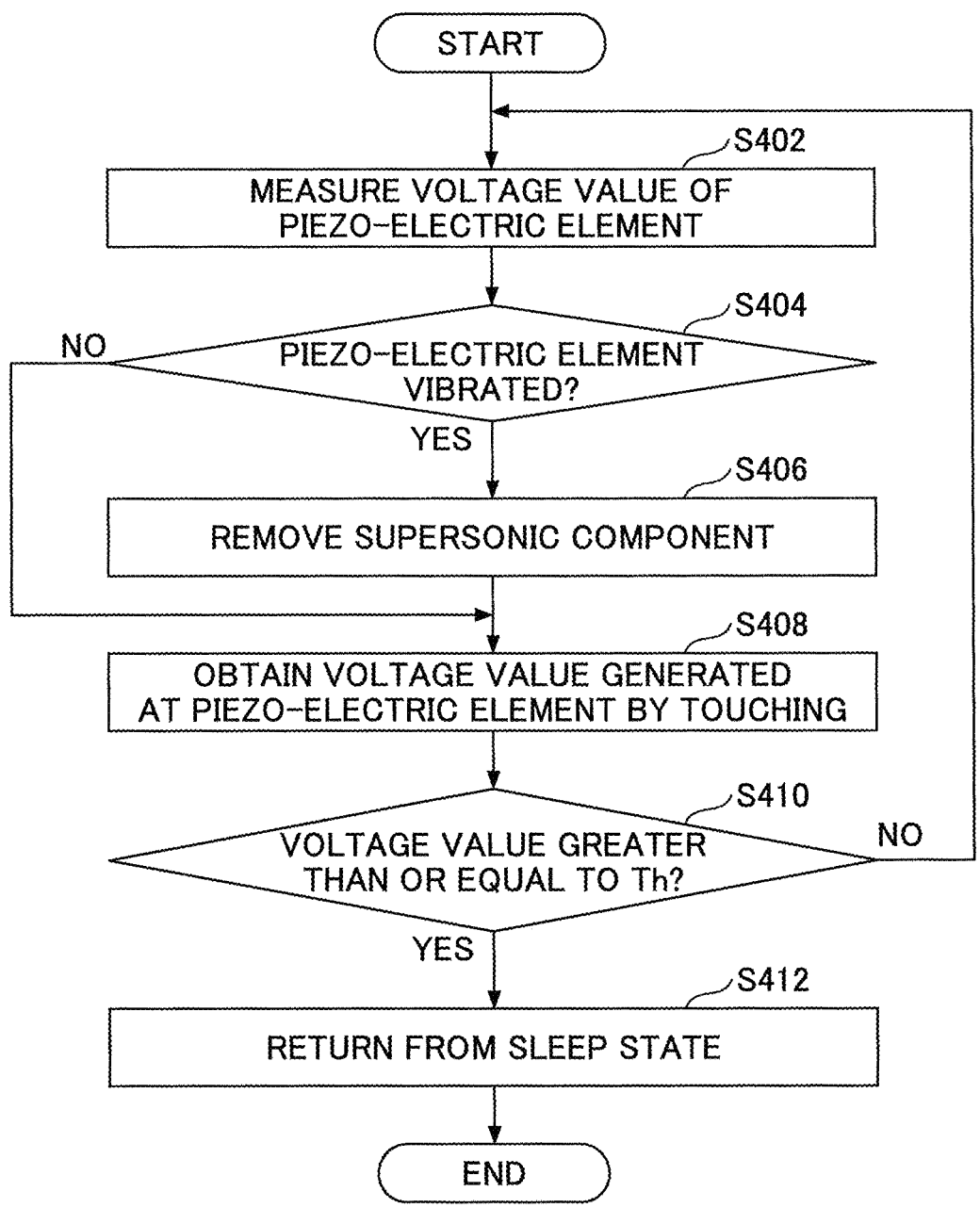
FIG. 17 is a flowchart of a method of controlling the tactile presentation device of a fourth embodiment.

When it is determined that at least one of the voltage values is greater than or equal to the threshold value "Th", in S412, the information terminal device 80 is returned from the sleep state to the activated state, and the processes of FIG. 17 are finished.

Here, in this embodiment, a method of controlling for returning the information terminal device 80 from the sleep state is described. In another example, by performing the process of removing the supersonic component in S406, information can be input to the information terminal device 80 at the activated state by touching a finger on the panel 20, while the piezo-electric elements are vibrated by supersonic.

Here, other than the above are the same as those of the first embodiment.

Fifth Embodiment

Next, a fifth embodiment is described. According to a method of controlling the tactile presentation device 10 of the fifth embodiment, when a finger touches the panel 20, a pattern for driving the piezo-electric elements is changed in accordance with a region of the panel 20 at which the finger touches. The method of controlling the tactile presentation device 10 of the embodiment is described with reference to FIG. 19.

First, in S502, voltage values of the piezo-electric elements are respectively measured.

Next, in S504, whether the piezo-electric elements are vibrated by supersonic is determined. When the piezo-electric elements are supersonically vibrated (YES in S504), the process proceeds to S506. On the other hand, when the piezo-electric elements are not vibrated by supersonic (NO in S504), the process proceeds to S508.

In S506, when the piezo-electric elements are vibrated by supersonic, the supersonic components are removed from the electrical signals obtained from the piezo-electric elements, respectively.

Next, in S508, the voltage value generated at each of the piezo-electric elements by the touching of the finger is obtained. When the piezo-electric elements are vibrated by supersonic, the voltage values of the electrical signals from which the supersonic components are respectively removed in S506 are obtained. Further, when the piezo-electric elements are not vibrated by supersonic, the voltage values of the electrical signals measured in S502 are obtained.

Next, in S510, whether each of the voltage values obtained in S508 is greater than or equal to a threshold value "Th" is determined. When at least one of the obtained voltage values is greater than or equal to the threshold value "Th" (YES in S510), the process proceeds to S512. On the other hand, when each of the obtained voltage values is less than the threshold value "Th" (NO in S510), the process returns to S502.

Figure 20A:
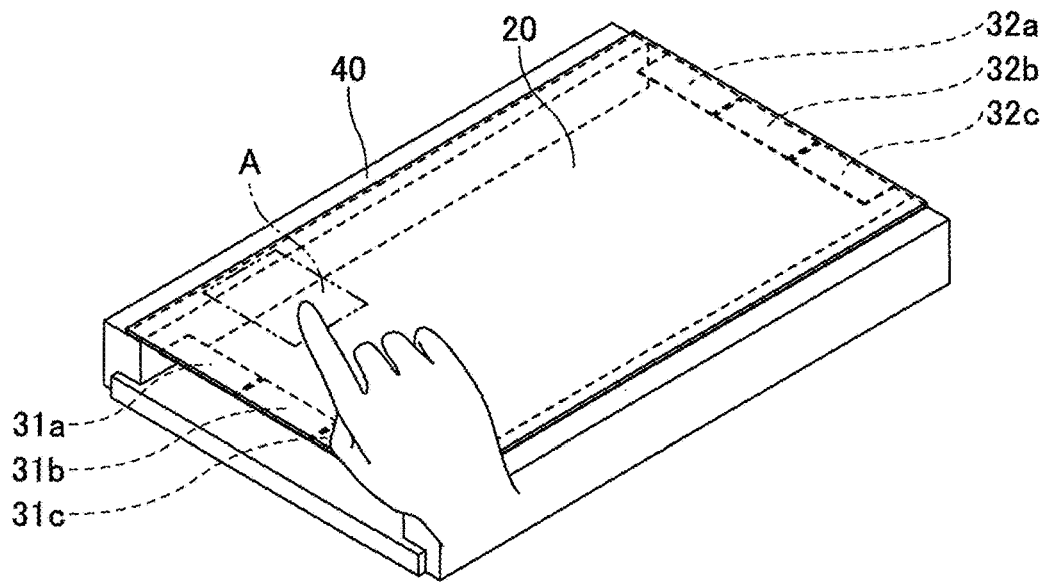
FIG. 20A to FIG. 20D are views for describing the method of controlling the tactile presentation device of the fifth embodiment.
Figure 20B:
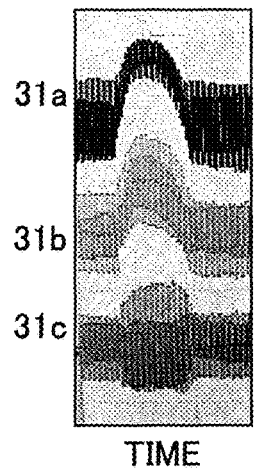
Figure 20C:
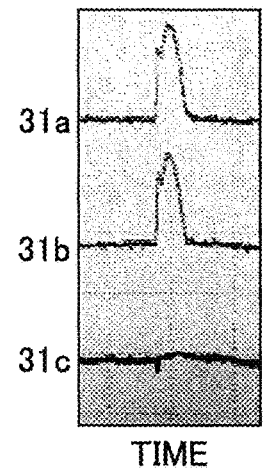

When at least one of the voltage values is greater than or equal to the threshold value "Th", in S512, a position of the finger touching the panel 20 is determined based on the voltage values of the piezo-electric elements obtained in S508. When the finger touches a region "A" of the panel 20 while the piezo-electric elements are vibrated by supersonic as illustrated in FIG. 20A, the electrical signals output from the piezo-electric elements 31a to 31c become waveforms as illustrated in FIG. 20B, respectively. When the supersonic components are removed from the outputs of the piezo-electric elements in S506, respectively, outputs as illustrated in FIG. 20C are obtained. For detecting the touched position of the panel 20, the waveforms of FIG. 20C are used. Here, for the case of FIG. 20A to FIG. 20C, the output of the piezo-electric element 31a becomes the largest.

Figure 21A:
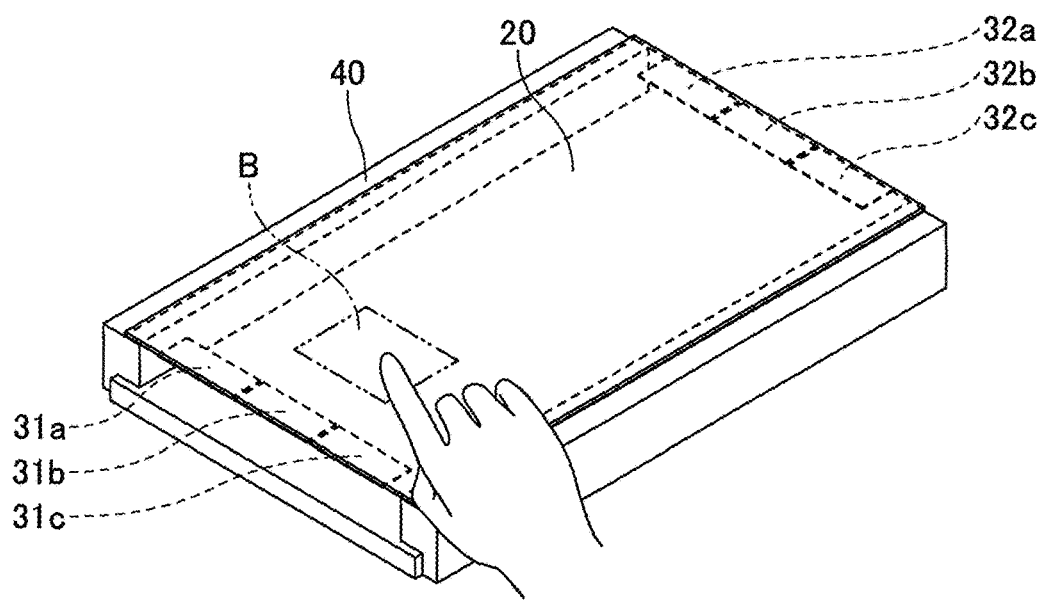
FIG. 21A to FIG. 21D are views for describing the method of controlling the tactile presentation device of the fifth embodiment.
Figure 21B:
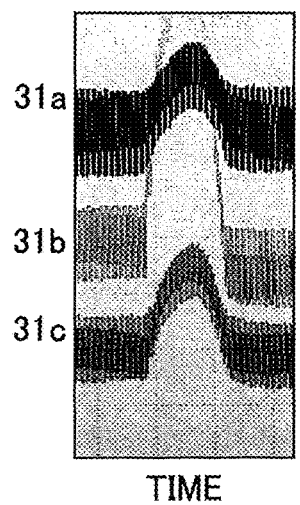
Figure 21C:
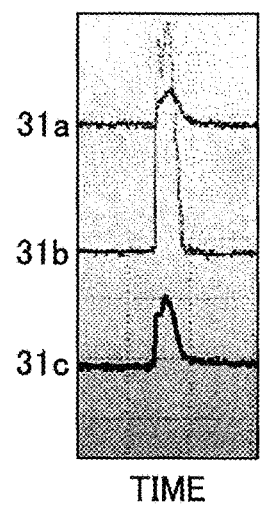

Further, as illustrated in FIG. 21A, when the finger touches a region "B" of the panel 20 at the left and center side, electrical signals of the piezo-electric elements 31a to 31c become waveforms as illustrated in FIG. 21B. By removing the supersonic components from the waveforms in S506, waveforms as illustrated in FIG. 21C are obtained. Then, the touched position is determined using these waveforms. For the case of FIG. 21A to FIG. 20C, the output of the piezo-electric element 31b becomes the largest.

Figure 22A:
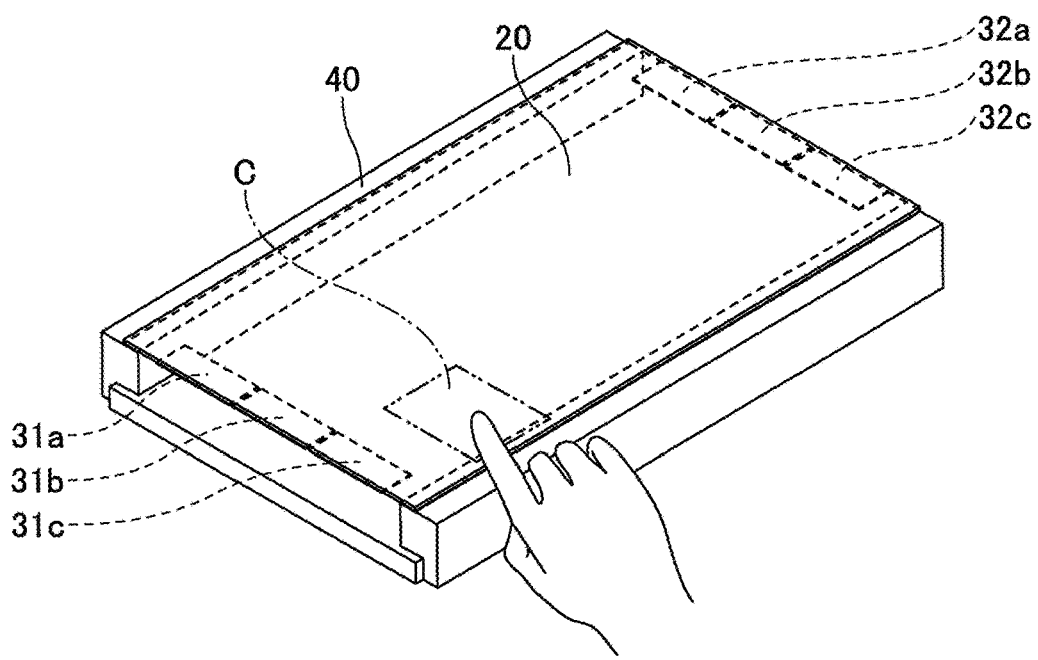
FIG. 22A to FIG. 22D are views for describing the method of controlling the tactile presentation device of the fifth embodiment.
Figure 22B:
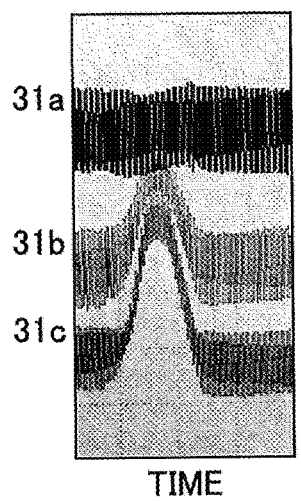
Figure 22C:
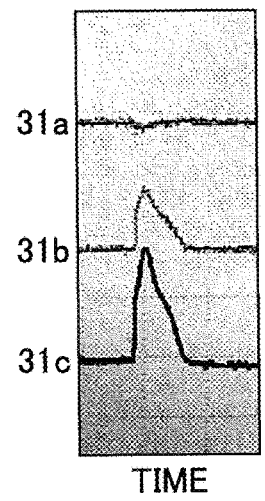

Further, as illustrated in FIG. 22A, when the finger touches a region "C" of the panel 20 at the left and lower side, electrical signals of the piezo-electric elements 31a to 31c become waveforms as illustrated in FIG. 22B. By removing the supersonic components from these waveforms, waveforms as illustrated in FIG. 22C are obtained. At this time, the output of the piezo-electric element 31c becomes the largest.

As described above, when the piezo-electric elements are vibrated by supersonic, by comparing signal intensities of the outputs of the piezo-electric element 31a to 31c after removing the supersonic components, respectively, a region of the panel 20 at which the finger touches can be specified.

Figure 19:
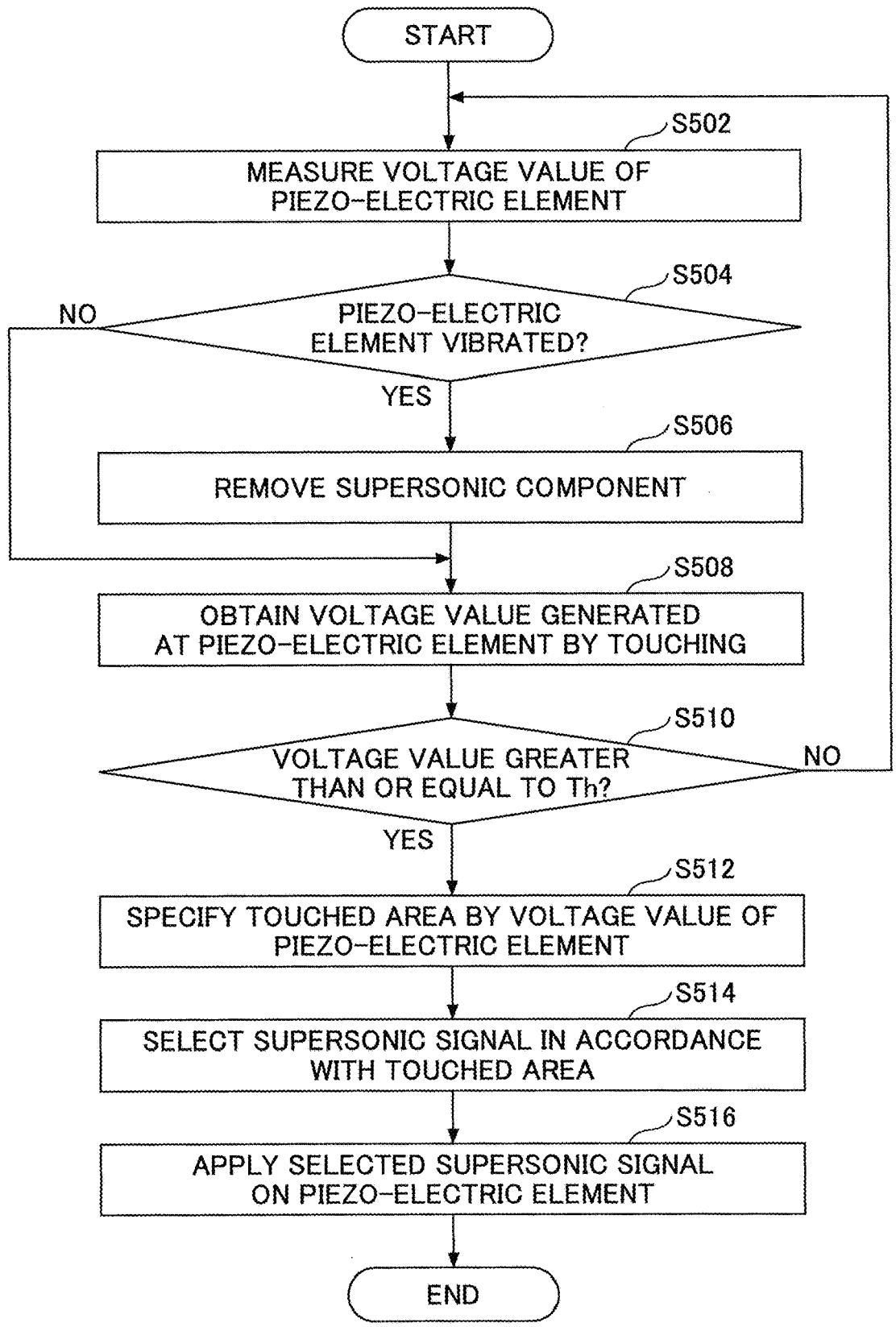
FIG. 19 is a flowchart of a method of controlling the tactile presentation device of a fifth embodiment.
Figure 20D:
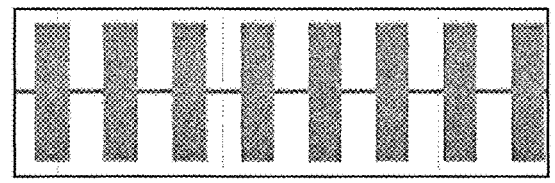

Next, in S514 of FIG. 19, a pattern of supersonic to be generated is selected in accordance with the region of the panel 20 at which the finger touches. For example, when the finger touches the region "A" as illustrated in FIG. 20A, a signal having a waveform as illustrated in FIG. 20D is generated. By applying this waveform to the piezo-electric elements, the air film at the surface of the panel 20 is changed corresponding to the waveform pattern of FIG. 20D, and a change in smoothness, such as a tactile sensation of a rugged surface, for example, can be applied to the finger touching the panel 20.

Figure 21D:
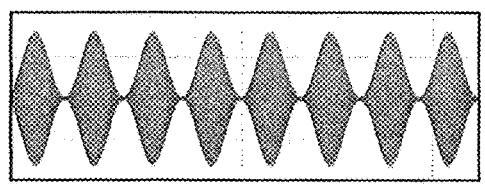

Further, when the finger touches the region "B" as illustrated in FIG. 21A, a signal having a waveform as illustrated in FIG. 21D is generated. By applying this waveform to the piezo-electric elements, a tactile sensation corresponding to the waveform of FIG. 21D such as a rough surface, for example, can be applied to the finger touching the panel 20.

Figure 22D:
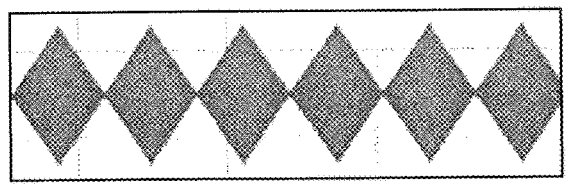

Further, when the finger touches the region "C" as illustrated in FIG. 22A, a signal having a waveform as illustrated in FIG. 22D is generated. By applying this waveform to the piezo-electric elements, a tactile sensation corresponding to the waveform of FIG. 22D such as a bumpy surface, for example, can be applied to the finger touching the panel 20.

Next, in S516, the supersonic signal of the pattern selected in S514 is applied to the piezo-electric elements. With this, the tactile sensation corresponding to either of the region "A", the region "B" and the region "C" at which the finger touches can be presented to the finger touching the panel 20.

Other than the above are the same as those of the first embodiment or the fourth embodiment.

Sixth Embodiment

Figure 23:
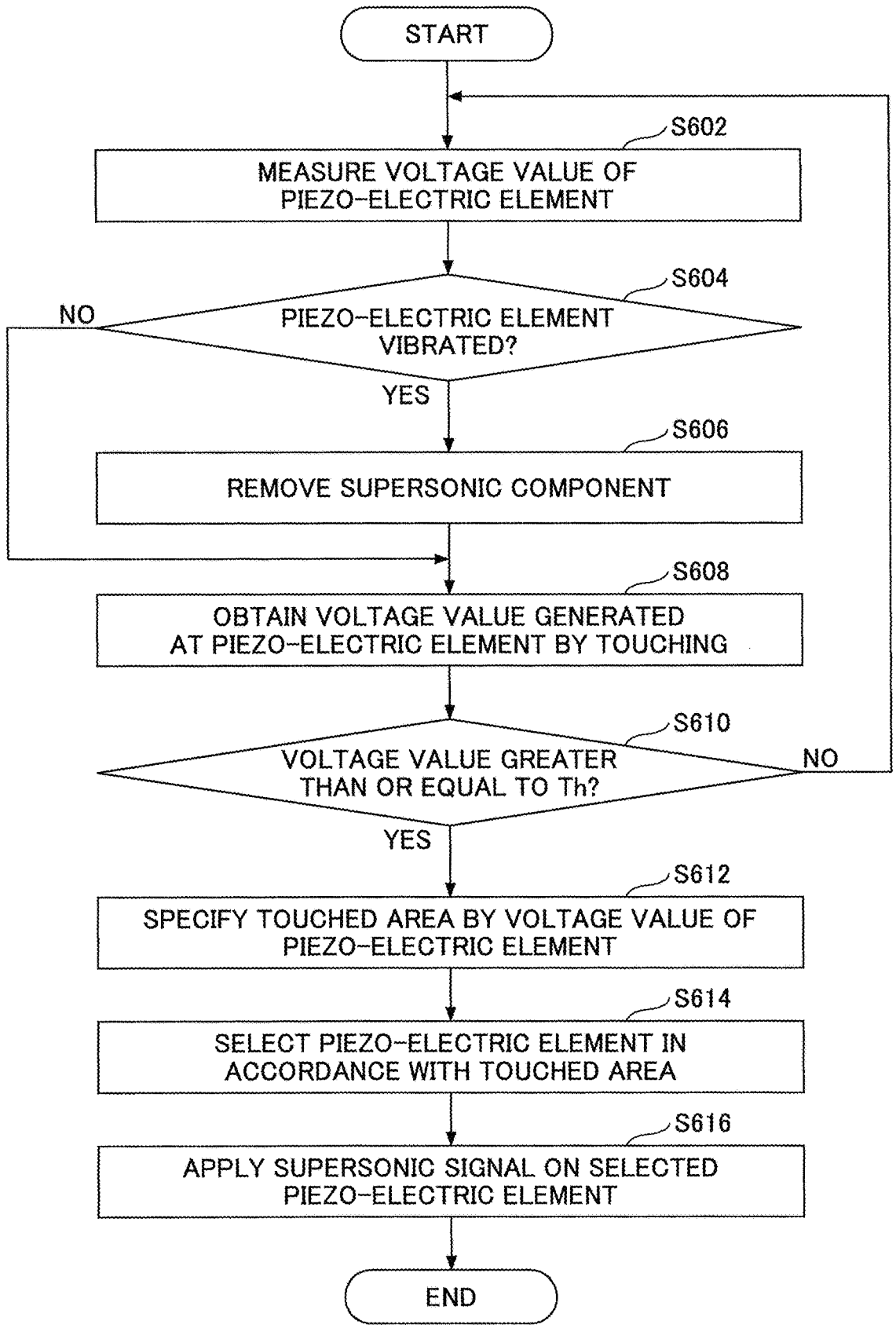
FIG. 23 is a flowchart of a method of controlling the tactile presentation device of a sixth embodiment.

Next, a sixth embodiment is described. According to a method of controlling of the tactile presentation device 10 of the sixth embodiment, when a finger touches the panel 20, a piezo-electric element to be driven is selected in accordance with a region of the panel 20 at which the finger touches. The method of controlling the tactile presentation device 10 of the embodiment is described with reference to FIG. 23.

First, in S602, voltage values of the piezo-electric elements are respectively measured.

Next, in S604, whether the piezo-electric elements are vibrated by supersonic is determined. When the piezo-electric elements are vibrated by supersonic (YES in S604), the process proceeds to S606. On the other hand, when the piezo-electric elements are not vibrated by supersonic (NO in S604), the process proceeds to S608.

In S606, when the piezo-electric elements are vibrated by supersonic, the supersonic components are removed from the electrical signals obtained from the piezo-electric elements, respectively.

Next, in S608, the voltage value generated at each of the piezo-electric elements by the touching of the finger is obtained. When the piezo-electric elements are vibrated by supersonic, the voltage values of the electrical signals from which the supersonic components are respectively removed in S606 are obtained. Further, when the piezo-electric elements are not vibrated by supersonic, the voltage values of the electrical signals measured in S602 are obtained.

Next, in S610, whether the voltage value obtained in S608 is greater than or equal to a threshold value "Th" is determined. When the obtained voltage value "Th" is greater than or equal to the threshold value (YES in S610), the process proceeds to S612. On the other hand, when the obtained voltage value is less than the threshold value "Th" (NO in S610), the process returns to S602 and voltage values of the piezo-electric elements are respectively measured again.

When the voltage value is greater than or equal to the threshold value "Th", in S612, a position of the finger touching the panel 20 is determined based on the voltage values of the piezo-electric elements obtained in S608. Specifically, similar to the fifth embodiment, by comparing the signal intensities of the outputs from the piezo-electric elements 31a to 31c and 32a to 32c, the region of the panel 20 at which the finger touches can be specified.

Next, in S614, the piezo-electric element to be vibrated by supersonic is selected in accordance with the region of the panel 20 at which the finger touches. For example, only the piezo-electric element that is the nearest from the touched region of the panel 20 is vibrated by supersonic. By vibrating only a specific piezo-electric element by supersonic, electrical power consumption for presenting the tactile sensation can be reduced, and as the piezo-electric element that is nearest from the touched position is vibrated, the tactile sensation can be efficiently applied. As illustrated in FIG. 20A, when the finger touches the region "A", the piezo-electric element 31a that is the nearest from the region "A" is selected as the piezo-electric element to be vibrated by supersonic. Further, as illustrated in FIG. 21A, when the finger touches the region "B", the piezo-electric element 31b that is the nearest from the region "B" is selected. Further, as illustrated in FIG. 22A, when the finger touches the region "C", the piezo-electric element 31c that is the nearest from the region "C" is selected.

Next, in S616, a supersonic signal is applied to the piezo-electric element selected in S614.

By performing such processes, a tactile sensation can be effectively and efficiently presented while limiting the number of the piezo-electric elements to be driven.

Here, other than the above are the same as those of the first embodiment and the fifth embodiment.

Seventh Embodiment

Next, a seventh embodiment is described. According to a method of controlling the tactile presentation device 10 of the seventh embodiment, an amplitude amount of the vibration of the piezo-electric element is controlled in accordance with force that pushes the panel 20 when a finger touches the panel 20. The method of controlling the tactile presentation device 10 of the embodiment is described with reference to FIG. 24.

Figure 24:
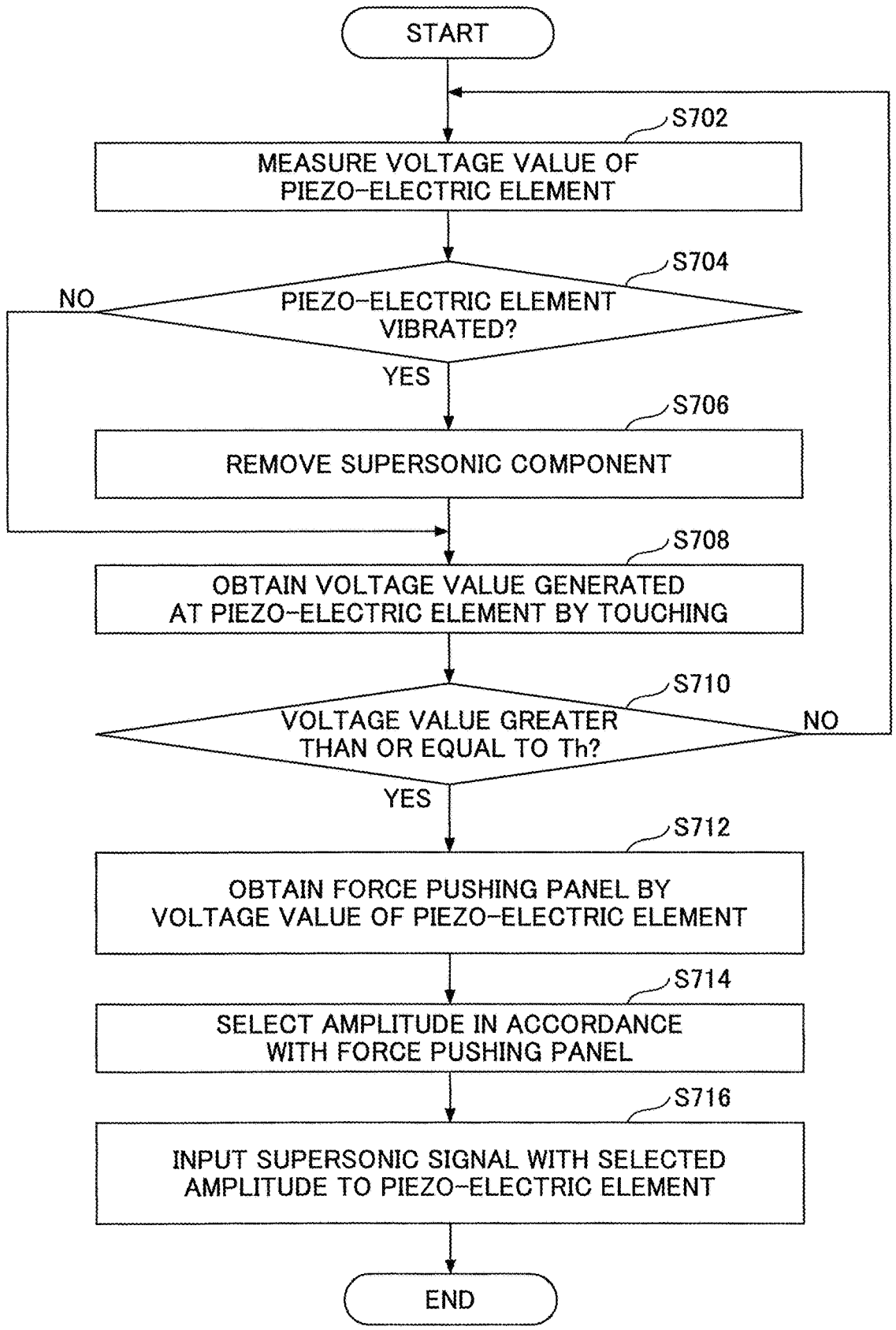
FIG. 24 is a flowchart of a method of controlling the tactile presentation device of a seventh embodiment.
Figure 25A:
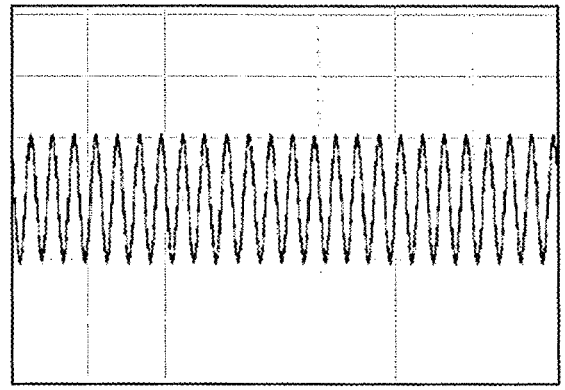
FIG. 25A to FIG. 25C are views for describing the method of controlling the tactile presentation device of the seventh embodiment.
Figure 25B:
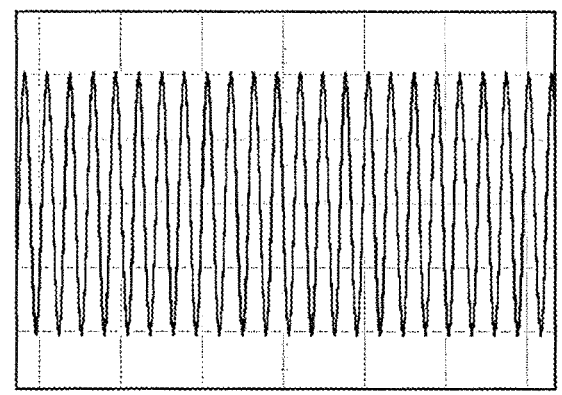
Figure 25C:
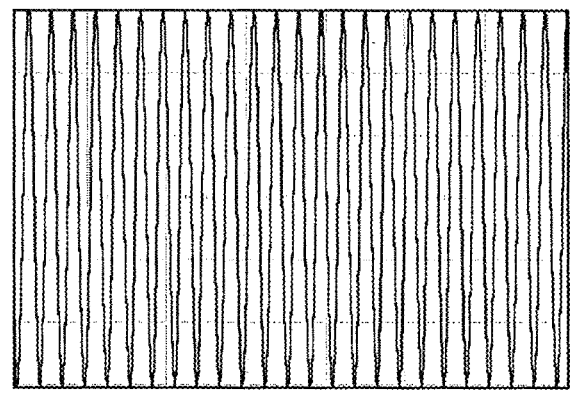
Figure 26:
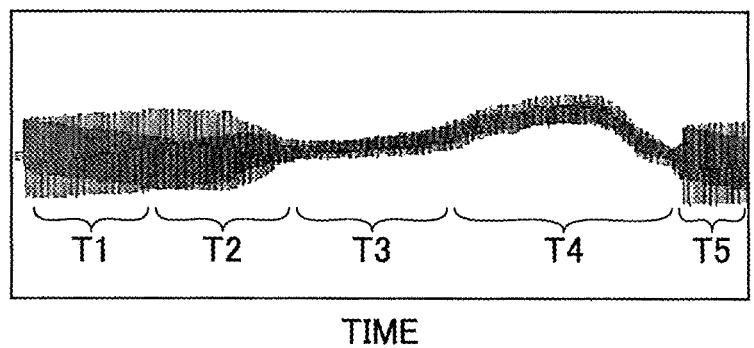
FIG. 26 is a view for describing a function of the tactile presentation device of the seventh embodiment.

FIG. 24 is a flowchart illustrating the method of controlling the tactile presentation device 10 of the embodiment. FIG. 25A to FIG. 25C are views illustrating amplitudes of supersonic signals to be applied to the piezo-electric element, respectively. FIG. 26 illustrates a waveform of output of the piezo-electric element that corresponds to variation in force pushing the panel 20.

In this embodiment, the amplitude for the vibration on the piezo-electric element is controlled to be larger as the force pushing the panel 20 becomes stronger. In other words, when the force pushing the panel 20 is small, the amplitude for the vibration on the piezo-electric element is controlled to be small.

FIG. 26 illustrates a waveform of an output of one of the piezo-electric elements when the panel 20 is pushed while the piezo-electric elements are vibrated by supersonic. When a user operates the panel 20, the user lightly touches the panel 20 first, and then gradually increases the force to push the panel 20. The vibration of the piezo-electric element is suppressed by the force pushing the panel 20. At this time, the output from the piezo-electric element is a waveform in which a component by the vibration of the piezo-electric element, and a component generated by pushing the panel 20 are superimposed. When the force pushing the panel varies, the output from the piezo-electric element is also varied. This is described with reference to FIG. 26.

A finger does not touch the panel 20 during a period T1 in FIG. 26. As the piezo-electric element is freely vibrated during the period T1, vibration amplitude of the output of the piezo-electric element is large. The finger starts to lightly touch the panel 20 at a period T2, and force is gradually applied on the panel 20 during the period T2. Although the vibration of the piezo-electric element is suppressed by the pushing force by the finger on the panel 20 during the period T2, as the force pushing the panel 20 is not strong, a degree to suppress the vibration of the piezo-electric element is small, and the amplitude of the output of the piezo-electric element does not largely change. Thereafter, when the force of the finger pushing the panel 20 becomes strong, the degree to suppress the vibration of the piezo-electric element becomes large as well, and the vibration amplitude of the signal output from the piezo-electric element becomes small. As the force pushing the panel 20 at a period T3 is larger than that during the period T2, the vibration amplitude of the output of the piezo-electric element becomes small as well. Meanwhile, as the force pushing the panel 20 increases, the output of the piezo-electric element increases as well, and the output increases in accordance with time. The output of the piezo-electric element becomes the maximum at a period T4 during which the panel 20 is pushed by the largest force. Thereafter, when the user starts to release the finger, the output of the piezo-electric element gradually decreases, and when the finger departs from the panel 20 at a period T5, a signal with a same waveform as that at the period T1 is output from the piezo-electric element.

By referring to the amplitude and the magnitude of the output of the piezo-electric element illustrated in FIG. 26, magnitude of force pushing the panel 20 can be easily determined.

Next, the method of controlling the tactile presentation device 10 is described with reference to FIG. 24. In FIG. 24, a situation in which the piezo-electric elements are not vibrated is also included.

First, in S702, voltage values of the piezo-electric elements are respectively measured.

Next, in S704, whether the piezo-electric elements are vibrated by supersonic is determined. When the piezo-electric elements are vibrated by supersonic (YES in S704), the process proceeds to S706. On the other hand, when the piezo-electric elements are not vibrated by supersonic (NO in S704), the process proceeds to S708.

In S706, when it is determined that the piezo-electric elements are vibrated by supersonic in S704, the supersonic components are removed from the electrical signals obtained from the piezo-electric elements, respectively.

Next, in S708, the voltage value generated at each of the piezo-electric elements by the touching of the finger is obtained. When the piezo-electric elements are vibrated by supersonic, the voltage values of the electrical signals from which the supersonic components are respectively removed in S706 are obtained. Further, when the piezo-electric elements are not vibrated by supersonic, the voltage values of the electrical signals measured in S702 are obtained.

Next, in S710, whether the voltage value obtained in S708 is greater than or equal to a threshold value "Th" is determined. When the obtained voltage value is greater than or equal to the threshold value "Th", the process proceeds to S712. On the other hand, when the obtained voltage value is less than the threshold value "Th", the process returns to S702, and voltage values of the piezo-electric elements are measured again.

When it is determined that the voltage value is greater than or equal to the threshold value "Th", in S712, force of the finger pushing the panel 20 is obtained based on the voltage value of the piezo-electric element obtained in S708. Specifically, the force of the finger pushing the panel 20 is obtained based on characteristics or the like as illustrated in FIG. 26.

Next, in S714, a power (amplitude) of the supersonic signal to be applied on the piezo-electric element is selected based on the force pushing the panel 20 obtained in S712. As described above, in this embodiment, the amplitude for the vibration on the piezo-electric element is controlled to be larger as the force pushing the panel 20 becomes stronger.

Thus, when the force pushing the panel 20 is weak, a small amplitude value illustrated in FIG. 25A is selected, and presents a relatively small tactile sensation. Further, when the force pushing the panel 20 is about middle, a middle amplitude value illustrated in FIG. 25B is selected, and presents a middle tactile sensation. Further, when the force pushing the panel 20 is strong, a large amplitude value illustrated in FIG. 25C is selected, and presents a relatively large tactile sensation.

Next, in S716, the supersonic signal having the amplitude value selected in S714 is input into each of the piezo-electric elements. By performing these processes, a tactile sensation corresponding to the force pushing the panel 20 can be presented.

Here, other than the above are the same as the first embodiment and the fifth embodiment.

Eighth Embodiment (Touch Panel)

Next, an eighth embodiment is described. In this embodiment, the tactile presentation device is used as a touch panel. As the above described tactile presentation device has a position detection function, by using this function as a touch panel, a display device that only has a display function, in other words, the display device that does not have a touch panel may be used as an information terminal device.

Figure 27:
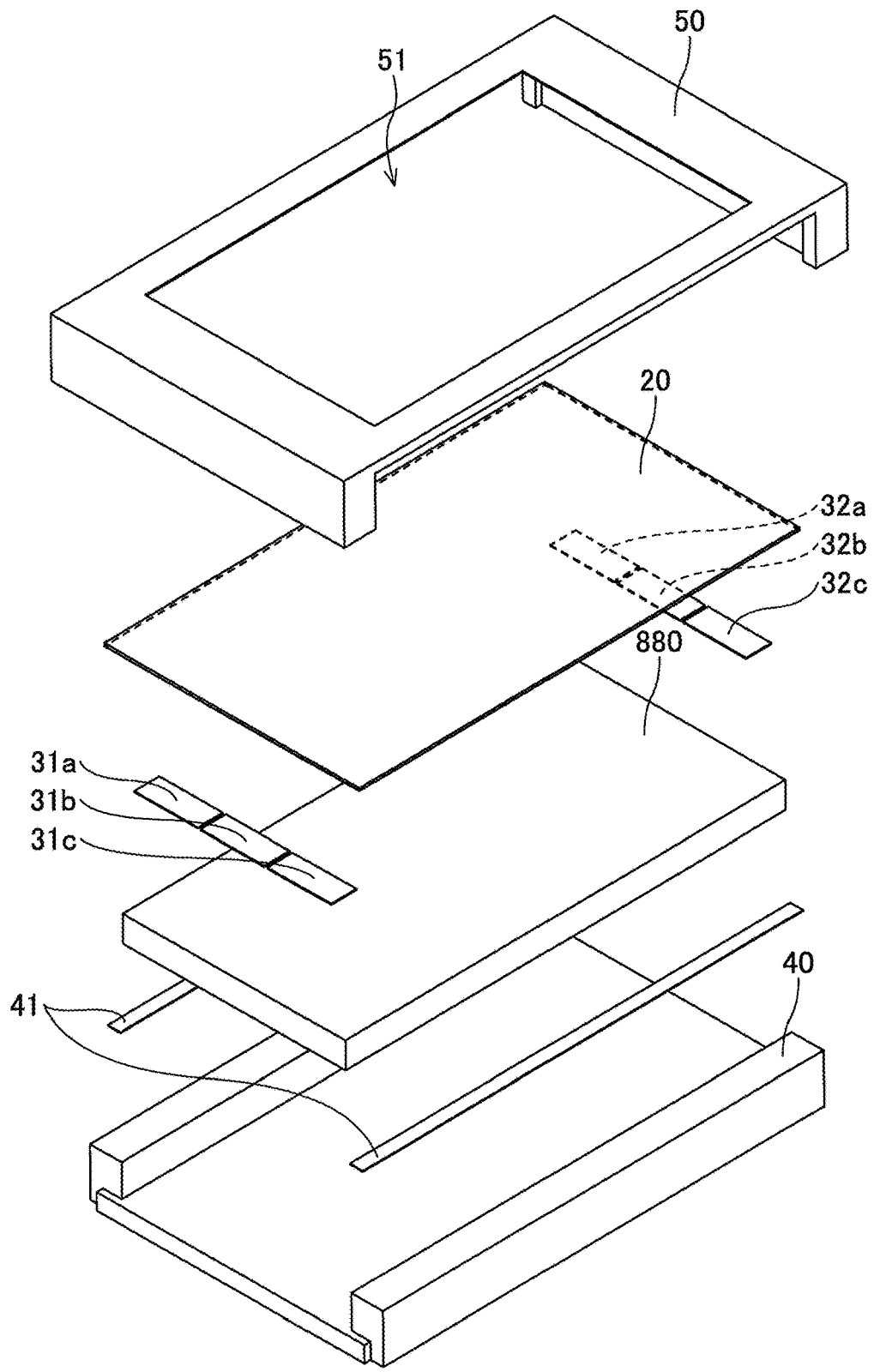
FIG. 27 is a view for describing a touch panel of an eighth embodiment.

As illustrated in FIG. 27, according to a touch panel of the embodiment, a display device 880 is provided between the panel base 40 and the panel 20. As described above, a display device 880 is a display that only has a display function. Here, the tactile presentation device of the embodiment and the display device 880 may be electrically connected with each other.

Further, the tactile presentation device of the embodiment may be used singularly as a touch pad, not providing on a display device. In such a case, as the display device is not used, the panel 20 may not be transparent.

The touch panel of the embodiment may be controlled similarly as the first embodiment to the seventh embodiment.

Further, positional information of the panel 20 at which the finger touches may be input to the display device 880.

According to the tactile presentation device of the disclosure, a display and a touch panel can be turned to sleep states, respectively.

Although a preferred embodiment of the tactile presentation device and the touch panel has been specifically illustrated and described, it is to be understood that minor modifications may be made therein without departing from the spirit and scope of the invention as defined by the claims.

The present invention is not limited to the specifically disclosed embodiments, and numerous variations and modifications may be made without departing from the spirit and scope of the present invention.

What is claimed is:

1. A tactile presentation device comprising:
a plate panel;
a piezo-electric element attached to the panel;
an actuator that drives the piezo-electric element to vibrate the piezo-electric element so that a tactile sensation is generated on the panel;
a detection unit that detects an electrical signal generated at the piezo-electric element, touching of an object to the panel being detected based on the detected electrical signal,
wherein the piezo-electric element is configured both to receive a first electrical signal from the actuator and to output a second electrical signal to the detection unit, the first electrical signal causing the piezo-electric element to vibrate the plate panel, the second electrical signal being generated in response to an external force applied to the piezo-electric element through the plate panel,
wherein the detection unit is configured to remove high-frequency ultrasonic components from a signal supplied from the piezo-electric element to detect low-frequency components upon determining that the actuator is applying the first electrical signal to the piezo-electric element, the high-frequency ultrasonic components having higher frequencies than the low-frequency components, and
wherein the piezo-electric element, the actuator, and the detection unit are configured to allow a touch-event sensor function of the piezo-electric element and a tactile-sensation-generator function of the piezo-electric element to be simultaneously used in a temporally overlapping manner.

2. The tactile presentation device according to claim 1, wherein the touching of the object to the panel is detected while the piezo-electric element is vibrated by the actuator.

3. The tactile presentation device according to claim 1, further comprising:
a control unit that returns the tactile presentation device to an activated state from a sleep state when the touching of the object to the panel is detected.

4. The tactile presentation device according to claim 1, further comprising:
a plurality of the piezo-electric elements,
wherein the detection unit detects the electrical signal generated at each of the piezo-electric elements, and detects a position on the panel at which the object touches based on the detected electrical signals.

5. The tactile presentation device according to claim 1, further comprising:
a plurality of the piezo-electric elements,
wherein the detection unit detects the electrical signal generated at each of the piezo-electric elements, and detects that the object is moving on the panel based on the detected electrical signals.

6. The tactile presentation device according to claim 1, further comprising:
a first group including a plurality of the piezo-electric elements, the plurality of piezo-electric elements of the first group being linearly aligned along a first side of the panel; and
a second group including a plurality of the piezo-electric elements, the plurality of piezo-electric elements of the second group being linearly aligned along a second side of the panel, the second side of the panel opposing the first side of the panel;
wherein the actuator drives each of the piezo-electric elements included in the first group and the piezo-electric elements included in the second group, and
wherein the detection unit detects the electrical signal generated at each of the piezo-electric elements included in the first group and the piezo-electric elements included in the second group.

7. A touch panel comprising:
the tactile presentation device of claim 1, wherein the detection unit detects the electrical signal generated at the piezo-electric element when the object touches the panel.

8. A tactile presentation device comprising:
a plate panel;
a first group of piezo-electric elements attached to the panel, and including a plurality of first piezo-electric elements, the first piezo-electric elements being linearly aligned in a first direction along a first side of the panel;

a second group of piezo-electric elements attached to the panel, and including a plurality of second piezo-electric elements, the second piezo-electric elements being linearly aligned in the first direction along a second side of the panel, the second side of the panel opposing the first side of the panel in a second direction; and a detection unit that detects electrical signals output from the piezo-electric elements, to determine a position and a movement of an object touching the panel, wherein the detection unit is configured to determine a position and a movement of the object touching the panel in the second direction based on a comparison between the electrical signals output from the first group and the electrical signals output from the second group, and determines a position and a movement of the object touching the panel in the first direction based on at least either of (1) a comparison between the electrical signals output from each of the first piezo-electric elements or (2) a comparison between the electrical signals output from each of the second piezo-electric elements, wherein the electrical signals output from the piezo-electric elements aligned in the first direction are compared along at least one of the first side and second side of the panel to determine the position and movement of the object in the first direction, and are compared between the first side and second side of the panel to determine the position and movement of the object in the second direction, and wherein neither a third side of the panel nor a fourth side of the panel has piezo-electric elements aligned therein, the third side and the fourth side extending in the second direction.

9. The tactile presentation device according to claim 8, wherein the first group includes three first piezo-electric elements, and the second group includes three second piezo-electric elements.

* * * * *